United States Patent
Yoshida et al.

(10) Patent No.: US 8,524,801 B2
(45) Date of Patent: Sep. 3, 2013

(54) WATER-BASED INK FOR INKJET PRINTING

(75) Inventors: Hiroyuki Yoshida, Wakayama (JP); Tsuyoshi Oda, Wakayama (JP); Takahiro Sato, Wakayama (JP); Yusuke Shimizu, Wakayama (JP); Koji Kamei, Wakayama (JP); Toshiya Iwasaki, Wakayama (JP)

(73) Assignee: Kao Corporation, Tokyo (JP)

(*) Notice: Subject to any disclaimer, the term of this patent is extended or adjusted under 35 U.S.C. 154(b) by 187 days.

(21) Appl. No.: 13/141,038

(22) PCT Filed: Dec. 17, 2009

(86) PCT No.: PCT/JP2009/071047
§ 371 (c)(1),
(2), (4) Date: Jul. 5, 2011

(87) PCT Pub. No.: WO2010/071177
PCT Pub. Date: Jun. 24, 2010

(65) Prior Publication Data
US 2011/0257309 A1      Oct. 20, 2011

(30) Foreign Application Priority Data

Dec. 19, 2008  (JP) ................. 2008-324565
Jun. 12, 2009  (JP) ................. 2009-141075

(51) Int. Cl.
- C08K 9/00  (2006.01)
- C09B 67/00  (2006.01)
- C09D 5/00  (2006.01)
- C09D 11/00  (2006.01)

(52) U.S. Cl.
USPC ........... 523/160; 523/161; 523/200; 523/205; 523/206; 523/333

(58) Field of Classification Search
USPC ............. 523/160, 161, 200, 205, 206, 333
See application file for complete search history.

(56) References Cited

U.S. PATENT DOCUMENTS 5,623,296 A      4/1997  Fujino et al.

FOREIGN PATENT DOCUMENTS

| EP | 0 606 490 A1 | 7/1994 |
|---|---|---|
| JP | 2005-162911 A | 6/2005 |
| JP | 2007-291252 A | 11/2007 |
| JP | 2008-68592 A | 3/2008 |
| WO | WO 94/01283 A1 | 1/1994 |

OTHER PUBLICATIONS

International Search Report for PCT/JP2009/071047 dated Mar. 30, 2010.
Notification of the First Office Action for corresponding Chinese Patent Application No. 200980151275.2, dated Feb. 21, 2013.
Notification of Reasons for Refusal for corresponding Japanese Patent Application No. 2008-324565, dated Feb. 5, 2013.

*Primary Examiner* — Patrick Niland
(74) *Attorney, Agent, or Firm* — Birch Stewart Kolasch & Birch, LLP

(57) ABSTRACT

The first invention relates to a water-based ink for ink-jet printing which includes colorant-containing polymer particles (A) obtained by dispersing a colorant with a water-soluble polymer (x) and a water-insoluble polymer (y), a water-soluble organic solvent (B) and water, wherein a weight ratio of the water-insoluble polymer (y) to the water-soluble polymer (x) [(y)/(x)] is from 2.0 to 5.0, and a content of the water-soluble organic solvent (B) in the ink is from 10 to 70% by weight. The water-based ink for ink-jet printing according to the first invention is excellent in ejection property and optical density and exhibits a low viscosity. The second invention relates to a process for producing a water dispersion for ink-jet printing, which includes a step (I) of mixing a dispersion of a colorant with an emulsion of a water-insoluble polymer containing an organic solvent; a step (II) of subjecting the resulting mixture to dispersing treatment to obtain a dispersion of the colorant onto which the water-insoluble polymer is deposited; and a step (III) of removing the organic solvent from the resulting dispersion. The water dispersion produced by the process of the second invention is capable of exhibiting a high optical density suitable for high-speed printing.

10 Claims, No Drawings

WATER-BASED INK FOR INKJET PRINTING

FIELD OF THE INVENTION

The present invention relates to water-based inks for ink-jet printing and a process for producing the water-based inks.

BACKGROUND OF THE INVENTION

In ink-jet printing methods, droplets of ink are directly projected onto a recording medium from very fine nozzles and allowed to adhere to the recording medium to form characters and images. The ink-jet printing methods have been rapidly spread because of their various advantages such as easiness of full coloration, low costs, capability of using plain paper as the recording medium, non-contact with printed images and characters, etc.

In recent years, ink-jet printers have been extensively used in domestic applications, office applications and commercial printing applications, and there is a current tendency that these ink-jet printers are of a high-speed printing type. In order to realize high-speed printing of the ink-jet printers, there have been adopted the method of increasing a capacity of each ink droplet, and the method of improving a printing head (from a serial head to a line head), etc., to reduce a printing frequency and increase a printing speed.

However, the high-speed printing method which is incapable of dual or triple overprinting unlike the conventional printing methods has many problems to be solved. That is, inks used for the high-speed printing are required to have sufficient dispersion stability and ejection stability so as not to cause deterioration in printing quality such as occurrence of thin-spots or bare spots. In addition, colorants used in the printing ink are required to exhibit a high color intensity such that printed images and characters have a high optical density only by one printing operation. In particular, when printed on a plain paper, the colorants must be prevented from penetrating into the paper.

There has been proposed the method of improving a dispersion stability and a storage stability of a water-based pigment dispersion by using two kinds of polymer dispersants therein.

JP 2000-239392A discloses a process for producing an aqueous pigment dispersion which includes the first step of dispersing a pigment in an aqueous medium using a surfactant and/or a water-soluble resin and the second step of mixing the resulting dispersion with a solution prepared by dissolving a self-emulsifiable resin having a specific molecular weight in a water-soluble solvent to deposit the self-emulsifiable resin on a surface of the pigment, for the purpose of improving a storage stability of the dispersion, etc.

JP 2004-277507A discloses an aqueous dispersion of pigment-enclosing polymer particles having a specific average particle size which includes a hydrophilic polymer, a hydrophobic polymer and a pigment, and a water-based ink containing the aqueous dispersion, for the purpose of improving a gloss of prints, etc.

JP 2003-292838A discloses a composition for ink-jet printing which is produced by dispersing a pigment in water using an organic polymer compound (A) having a specific Tg, a specific acid value and a specific molecular weight as a dispersant, and then adding an organic polymer compound (B) having a specific Tg, a specific acid value and a specific molecular weight to the resulting dispersion, and a recording solution for ink-jet printing, for the purpose of improving a storage stability thereof.

JP H11-116881A discloses a colorant composition containing, as a colorant, capsulated particles obtained by enclosing a pigment in a capsule formed of a hydrophilic resin and a hydrophobic resin, and an ink for ink-jet printing, for the purpose of preventing clogging of nozzles, etc.

JP 2000-219841A discloses an aqueous pigment dispersion using two or more kinds of anionic group-containing organic polymer compounds which are different in solubility parameter from each other, and an aqueous recording solution, for the purpose of attaining satisfactory dispersion stability, dispersion viscosity and printability thereof.

JP 1108-209045A discloses a process for producing an ink for ink-jet printing containing a pigment, a water-soluble resin dispersant, a resin emulsion, a sugar and a water-based dispersing medium in which the pigment is dispersed in the dispersing medium and then mixed with various additives to prepare an ink, and thereafter the obtained ink is allowed to pass through a plurality of fine orifices to suitably control a particle size of the pigment particles therein.

JP 2000-160093A discloses an aqueous pigment dispersion which contains at least a pigment and two or more kinds of anionic group-containing organic polymer compounds which are different in weight-average molecular weight from each other.

JP 1110-195352A (JP 3069543) discloses an ink composition for ink-jet printing which includes a pigment dispersion containing a medium solution containing a water-insoluble hydrosol polymer.

According to the above-described patent documents, the resulting dispersions are improved in dispersion stability to a certain extent, but tend to be deteriorated in printability on plain papers upon high-speed printing and hardly exhibit a high optical density on prints.

JP 2007-92059A (JP 3981396) discloses a process for producing a water-based pigment dispersion in which an emulsion composition (A) containing a water-insoluble polymer, an organic solvent, a neutralizing agent and water is mixed with a pigment (B) to prepare a preliminary dispersion, and then the resulting preliminary dispersion is continuously dispersed and separated using a media disperser and further subjected to dispersing treatment using a homogenizer. However, when using such a water-insoluble polymer, the pigment particles tend to be hardly finely pulverized and dispersed, so that the resulting dispersion fails to exhibit a sufficient optical density required for the high-speed printing.

SUMMARY OF THE INVENTION

The present invention relates to the following first and second inventions.

First invention: A water-based ink for ink-jet printing including colorant-containing polymer particles (A) obtained by dispersing a colorant with a water-soluble polymer (x) and a water-insoluble polymer (y), a water-soluble organic solvent (B) and water, wherein a weight ratio of the water-insoluble polymer (y) to the water-soluble polymer (x) [(y)/(x)] is from 2.0 to 5.0, and a content of the water-soluble organic solvent (B) in the ink is from 10 to 70% by weight.

Second invention: A process for producing a water dispersion for ink-jet printing, including the following steps (I) to (III):

Step (I): mixing a dispersion of a colorant with an emulsion of a water-insoluble polymer containing an organic solvent;

Step (II): subjecting a mixture obtained in the step (I) to dispersing treatment to obtain a dispersion of the colorant onto which the water-insoluble polymer is deposited; and Step (III): removing the organic solvent from the dispersion obtained in the step (II).

DETAILED DESCRIPTION OF THE INVENTION

<First Invention>

In the conventional inks using water-insoluble dispersible colorants such as pigments, colorant particles remain on a surface of a recording paper to develop a color thereof. In the water-based inks having a penetrability, a part of the colorant particles are penetrated into the paper. Further, in recent years, in order to comply with high-speed printing, inks having a higher penetrability have been used. As a result, it becomes more difficult to enhance an optical density of printed images or characters. When an amount of the pigment added to the inks increases to enhance the optical density, there tends to occur problems such as clogging of nozzles in printers and poor ejection property of the inks from the printers owing to the increased viscosity of the inks, which will make it difficult to satisfy both of a good penetrability and a high optical density. In addition, the inks having a high viscosity also tend to suffer from various problems such as poor ejection property and low storage stability.

Thus, the first invention relates to a water-based ink for ink-jet printing which is excellent in ejection property and optical density and has a low viscosity, and a process for producing the water-based ink.

The present inventors have made extensive researches for obtaining the inks for ink-jet printing which is excellent in ejection property and optical density and has a low viscosity in consideration that it is important to suitably combine a polymer for dispersing the colorant and a solvent for the ink with each other. As a result, it has been found that the above conventional problems can be solved by using a water-soluble polymer in combination with a water-insoluble polymer at a specific mixing ratio, and controlling an amount of a water-soluble organic solvent to be contained in the inks to a specific range.

The water-based ink for ink-jet printing according to the first invention includes colorant-containing polymer particles (A) obtained by dispersing a colorant with a water-soluble polymer (x) and a water-insoluble polymer (y), a water-soluble organic solvent (B) and water, wherein a weight ratio of the water-insoluble polymer (y) to the water-soluble polymer (x) [(y)/(x)] is from 2.0 to 5.0, and a content of the water-soluble organic solvent (B) in the ink is from 10 to 70% by weight.

In the colorant-containing polymer particles (A) used in the present invention, the water-soluble polymer (x) and the water-insoluble polymer (y) are used in combination with each other as a dispersant for the colorant, whereby the resulting water-based ink for ink-jet printing has an excellent optical density and a low viscosity.

The reason why the ink of the first invention is effectively improved in ejection property and optical density and has a low viscosity is considered as follows although not clearly determined yet. That is, it is suggested that since the colorant is finely dispersed in aqueous medium with the water-soluble polymer (x) which molecule is apt to be absorbed into the colorant in an aqueous medium, color-developing portions of the colorant are increased to enhance an optical density of the ink, and further since the surface of the colorant is coated with the water-insoluble polymer (y), the colorant is improved in dispersion stability to enhance an ejection property of the ink. In addition, the water-soluble polymer (x) and the water-insoluble polymer (y) cooperate to form a polymer phase capable of closely adhering to the colorant. Therefore, when using the water-soluble organic solvent, preferably a relatively hydrophobic water-soluble organic solvent having a solubility parameter of from 5.0 to 15.0, it is considered that the water-soluble polymer (x) is prevented from eluting out, so that elution or desorption of the polymer from the colorant can also be effectively prevented, resulting in improvement in ejection property of the ink.

Further, since the weight ratio of the water-insoluble polymer (y) to the water-soluble polymer (x) [(y)/(x)] is adjusted to the range of from 2.0 to 5.0, i.e., since the water-soluble polymer (x) is used in an amount considerably smaller than that of the water-insoluble polymer (y), it is considered that the water-soluble polymer (x) is prevented from eluting out and the resulting ink has a reduced viscosity and is improved in ejection property.

In the following, the respective components of the water-based ink according to the first invention are described.

<Colorant>

The colorant is preferably a pigment or a hydrophobic dye in view of a good water resistance. Among these colorants, to meet the recent strong demand for a high weather resistance, preferred is the pigment. The pigment may be either organic or inorganic. The organic or inorganic pigment may be used in combination with an extender pigment, if required.

Examples of the inorganic pigment include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

The color of the organic pigment is not particularly limited. The organic pigment may be any of chromatic pigments such as red color organic pigments, yellow color organic pigments, blue color organic pigments, orange color organic pigments and green color organic pigments.

Examples of the organic pigment include phthalocyanine pigments, quinacridone pigments, isoindolinone pigments, dioxazine pigments, perylene pigments, perinone pigments, thioindigo pigments, anthraquinone pigments, quinophthalone pigments, diazo pigments and azo pigments. Among these organic pigments, preferred are azo pigments because they are excellent in effect of enhancing an optical density of the resulting ink.

Specific examples of the phthalocyanine pigments include C.I. Pigment Green 7, 36 and 37, C.I. Pigment Blue 16, 75 and 15 and the like. Specific examples of the quinacridone pigments include C.I. Pigment Violet 19 and 42, C.I. Pigment Red 122, 192, 202, 207 and 209 and the like. Specific examples of the dioxazine pigments include C.I. Pigment Violet 23 and 37, and the like. Specific examples of the perylene pigments include C.I. Pigment Red 190 and 224, C.I. Pigment Violet 29 and the like. Specific examples of the perinone pigments include C.I. Pigment Orange 43, C.I. Pigment Red 194 and the like. Specific examples of the thioindigo pigments include C.I. Pigment Red 88 and the like. Specific examples of the anthraquinone pigments include C.I. Pigment Yellow 147 and the like. Specific examples of the diazo pigments include C.I. Pigment Yellow 13, 83 and 188 and the like. Specific examples of the azo pigments include C.I. Pigment Red 187, 170, 48, 53 and 247, C.I. Pigment Yellow 74 and 150, C.I. Pigment Orange 64 and the like.

In addition, in the present invention, a solid solution pigment may also be used. The solid solution pigment is preferably a quinacridone solid solution pigment composed of a β-type or γ-type unsubstituted quinacridone and a dichloroquinacridone such as 2,9-dichloroquinacridone, 3,10-dichloroquinacridone and 4,11-dichloroquinacridone, and more preferably a solid solution composed of combination of an unsubstituted quinacridone (C.I. Pigment Violet 19) and 2,9-dichloroquinacridone (C.I. Pigment Red 202).

In the present invention, there may also be used a self-dispersible pigment. The "self-dispersible pigment" as used herein means an inorganic or organic pigment onto a surface of which at least one hydrophilic functional group (including an anionic hydrophilic group such as a carboxyl group and a sulfonic group or a cationic hydrophilic group such as a quaternary ammonium group) is bonded either directly or through the other atom group to thereby render the pigment dispersible in an aqueous medium without using a surfactant or a resin. Examples of the other atom group include an alkanediyl group having 1 to 12 carbon atoms, a phenylene group and a naphthylene group. When the self-dispersible pigment is in the form of anionic colorant particles, the hydrophilic functional group is preferably an anionic hydrophilic group such as a carboxyl group and a sulfonic group.

In order to render the pigment self-dispersible, for example, a necessary amount of the above hydrophilic functional group may be chemically bonded to a surface of the pigment by any ordinary method. More specifically, there may be used the method of subjecting the pigment to liquid-phase oxidation using an acid such as nitric acid, sulfuric acid, peroxydisulfuric acid, hypochlorous acid and chromic acid, the method of bonding a hydrophilic group to the pigment using a coupling agent, or the like.

The amount of the hydrophilic functional group to be bonded to the surface of the self-dispersible pigment is not particularly limited, and is preferably from 100 to 3,000 μmol per 1 g of the self-dispersible pigment. The carboxyl group as the hydrophilic functional group is preferably bonded to the surface of the self-dispersible pigment in an amount of from 200 to 700 μmol per 1 g of the self-dispersible pigment.

Examples of commercially available products of the anionic self-dispersible pigment include "CAB-O-JET 200", "CAB-O-JET 300", "CAB-O-JET 1027R", "CAB-O-JET 250C", "CAB-O-JET 260M", "CAB-O-JET 270Y" and "CAB-O-JET 554B" all available from Cabot Corporation, "BONJET CW-1" and "BONJET CW-2" both available from Orient Chemical Industries Co., Ltd., and "Aqua-Black 162" available from Tokai Carbon Co., Ltd.

Among these pigments, from the viewpoints of good dispersibility and high optical density, preferred are organic pigments, more preferred are phthalocyanine pigments and azo pigments, and still more preferred are azo pigments. More specifically, C.I. Pigment Blue 15:3, C.I. Pigment Blue 15:4 and C.I. Pigment Yellow 74 are preferred, and from the viewpoint of enhancing an optical density, C.I. Pigment Yellow 74 is more preferred.

Examples of the extender pigment include silica, calcium carbonate and talc.

The hydrophobic dyes are not particularly limited, and any hydrophobic dyes may be used as long as they are capable of being emulsified by the water-soluble polymer or being included in the water-soluble polymer. To allow the dye to efficiently become included in the polymer, the solubility of the hydrophobic dye is preferably 2 g/L or more and more preferably from 20 to 500 g/L as measured at 25° C. on the basis of the organic solvent used upon the production of the polymer (such as preferably methyl ethyl ketone).

Examples of the hydrophobic dyes include oil-soluble dyes and disperse dyes. Among these dyes, preferred are oil-soluble dyes. Examples of the oil-soluble dyes include one or more dyes selected from the group consisting of C.I. Solvent Black, C.I. Solvent Yellow, C.I. Solvent Red, C.I. Solvent Violet, C.I. Solvent Blue, C.I. Solvent Green and C.I. Solvent Orange with various product numbers, which are commercially available from Orient Chemical Industries Co., Ltd., BASF SE, etc.

The above colorants may be used alone or in the form of a mixture containing any two or more thereof at an optional mixing ratio.

<Definitions of Water-Soluble Polymer (x) and Water-Insoluble Polymer (y)>

The water-based ink of the present invention includes the water-soluble polymer (x) and the water-insoluble polymer (y).

The "water-soluble polymer (x)" and the "water-insoluble polymer (y)" as used herein respectively mean the following polymers. That is, in the case where the polymers have a salt-forming group, 100 g of pure water at 25° C. are added to 10 g of the respective polymers whose salt-forming groups are neutralized completely (i.e., 100%) with acetic acid or sodium hydroxide according to kinds of the salt-forming groups to be neutralized, and the resulting mixture is fully stirred. At this time, when the polymer is completely dissolved in the pure water, the polymer is defined as the "water-soluble polymer (x)". Meanwhile, when using the commercially available polymer or using the polymer having a neutralization degree of less than 100% which is neutralized with a neutralizing agent other than acetic acid or sodium hydroxide upon synthesis thereof, such a polymer is neutralized 100% by adding acetic acid or sodium hydroxide thereto to determine a solubility thereof.

In the above solubility test, if the polymer partially remains undissolved, the pure water might be difficult to penetrate into the polymer. In such a case, whether the polymer is the water-soluble polymer (x) or the water-insoluble polymer (y) is determined by the following procedure. That is, the polymer is previously dissolved in an organic solvent such as methyl ethyl ketone. The resulting solution is dropped into pure water, and the organic solvent is removed therefrom to prepare a 10 wt % dispersion. Then, the dispersion is separated into respective components by centrifugal separation, membrane filtration, etc. Thereafter, the polymer dissolved in water is determined as the "water-soluble polymer (x)", whereas the remaining undissolved polymer is determined as the "water-insoluble polymer (y)".

<Water-Soluble Polymer (x)>

The water-soluble polymer (x) used in the water-based ink of the present invention is not particularly limited. From the viewpoint of dispersing the colorant therein in an efficient manner, the water-soluble polymer (x) is preferably a vinyl polymer obtained by addition-polymerizing a vinyl monomer, and more preferably a vinyl polymer which is produced by copolymerizing a monomer mixture containing (a) a salt-forming group-containing monomer (hereinafter occasionally referred to merely as a "component (a)") and (b) a hydrophobic monomer (hereinafter occasionally referred to merely as a "component (b)") (such a mixture is hereinafter occasionally referred to merely as a "monomer mixture").

[(a) Salt-Forming Group-Containing Monomer]

The salt-forming group-containing monomer (a) is used for enhancing a dispersibility of the resulting polymer particles. It is considered that when the polymer particles have an enhanced dispersibility, the water-based ink containing the polymer particles can be improved in ejection property.

Examples of the salt-forming group-containing monomer (a) include cationic monomers and anionic monomers. Among these monomers, preferred are anionic monomers.

Examples of the salt-forming group include anionic groups such as a carboxyl group, a sulfonic group and a phosphoric group, an amino group and an ammonium group. Among these salt-forming groups, especially preferred is a carboxyl group.

Typical examples of the cationic monomers include amine-containing monomers and ammonium salt-containing monomers. Among these cationic monomers, preferred are N,N-dimethylaminoethyl (meth) acrylate, N—(N',N'-dimethylaminopropynl) (meth) acrylamide and vinyl pyrrolidone.

Typical examples of the anionic monomers include carboxylic acid monomers, sulfonic acid monomers and phosphoric acid monomers.

Specific examples of the carboxylic acid monomers include acrylic acid, methacrylic acid, crotonic acid, itaconic acid, maleic acid, fumaric acid, citraconic acid and 2-methacryloyloxymethylsuccinic acid.

Specific examples of the sulfonic acid monomers include styrenesulfonic acid, 2-acrylamido-2-methylpropanesulfonic acid, 3-sulfopropyl (meth)acrylate and bis(3-sulfopropyl) itaconate.

Specific examples of the phosphoric acid monomers include vinylphosphonic acid, vinyl phosphate, bis(methacryloxyethyl) phosphate, diphenyl-2-acryloyloxyethyl phosphate, diphenyl-2-methacryloyloxyethyl phosphate and dibutyl-2-acryloyloxyethyl phosphate.

Among the above anionic monomers, from the viewpoints of a good dispersibility of the polymer particles, preferred are the carboxylic acid monomers, and more preferred are acrylic acid and methacrylic acid. Further, from the viewpoint of a solubility in water, acrylic acid is especially preferred.

[(b) Hydrophobic Monomer]

The hydrophobic monomer (b) is used for enhancing an affinity of the polymer to the colorant. Examples of the hydrophobic monomer include alkyl (meth)acrylates and aromatic group-containing monomers. Among these hydrophobic monomers, from the viewpoints of enhancing an affinity to the colorant as well as a dispersibility and a stability of the polymer particles, preferred are aromatic group-containing monomers.

The preferred alkyl (meth)acrylates are those containing an alkyl group having 1 to 22 carbon atoms and preferably 6 to 18 carbon atoms. Examples of the alkyl (meth)acrylates include methyl (meth)acrylate, ethyl (meth)acrylate, (iso) propyl (meth)acrylate, (iso- or tertiary-)butyl (meth)acrylate, (iso)amyl (meth)acrylate, cyclohexyl (meth)acrylate, 2-ethylhexyl (meth)acrylate, (iso)octyl (meth)acrylate, (iso)decyl (meth)acrylate, (iso)dodecyl (meth)acrylate and (iso)stearyl (meth)acrylate.

Meanwhile, the terms "(iso- or tertiary-)" and "(iso)" as used herein mean both the case where the group expressed by any of "iso" and "tertiary" is present, and the case where any of these groups is not present (i.e., normal). The term "(meth) acrylate" means an acrylate and/or a methacrylate.

Examples of the aromatic group-containing monomer include styrene-based monomers and aromatic group-containing (meth)acrylates. Examples of styrene-based monomers include styrene and 2-methyl styrene. Examples of the aromatic group-containing (meth)acrylates include benzyl (meth)acrylate and phenoxyethyl (meth)acrylate.

Among them, as the component (b), preferred are styrene and benzyl (meth)acrylate, and more preferred is styrene.

The water-soluble polymer (x) preferably contains a constitutional unit derived from the component (a) in an amount of from 5 to 80% by weight, more preferably from 10 to 60% by weight and still more preferably from 15 to 40% by weight, and a constitutional unit derived from the component (b) in an amount of from 15 to 95% by weight, more preferably from 25 to 90% by weight, still more preferably from 50 to 90% by weight and further still more preferably from 50 to 80% by weight. The constitutional unit derived from the component (b) is preferably a constitutional unit derived from the styrene monomer. The content of the constitutional unit derived from the styrene monomer in the water-soluble polymer (x) is preferably from 50 to 90% by weight and more preferably from 50 to 80% by weight on the basis of a total weight of all monomers contained in the water-soluble polymer (x).

The water-soluble polymer (x) preferably has a weight-average molecular weight of from 1,000 to 30,000 and more preferably from 2,000 to 20,000 from the viewpoint of a good dispersibility. Meanwhile, the weight-average molecular weight of the water-soluble polymer (x) may be measured by the method described in Examples below.

The water-soluble polymer (x) in which the anionic monomer is used as the component (a) preferably has an acid value of from 100 to 300 mg KOH/g and more preferably from 150 to 250 mg KOH/g.

Examples of commercially available products of the water-soluble polymer (x) include "JONCRYL (registered trademark) 57J", "JONCRYL 60J", "JONCRYL 61J", "JONCRYL 63J", "JONCRYL 70J", "JONCRYL PD-96J" and "JONCRYL 501J" all available from BASF Japan, Ltd.

<Water-Insoluble Polymer (y)>

The water-insoluble polymer (y) used in the water-based ink of the present invention is not particularly limited. From the viewpoints of a good filtering property and a good storage stability of the resulting water-based ink, the water-insoluble polymer (y) is preferably a vinyl polymer obtained by addition-polymerizing a vinyl monomer, and more preferably a vinyl polymer which is produced by copolymerizing a monomer mixture containing (a) a salt-forming group-containing monomer (which is the same as the above component (a)) and (b) a hydrophobic monomer (which is the same as the above component (b)) (the monomer mixture is the same as the above monomer mixture).

The salt-forming group-containing monomer (a) used for the water-insoluble polymer (y) is preferably a monomer containing an anionic group such as a carboxyl group, a sulfonic group and a phosphoric group, more preferably a carboxylic acid monomer, and still more preferably acrylic acid and methacrylic acid, from the viewpoint of a good dispersibility of the polymer particles. Among these monomers, from the viewpoint of a solubility in water, methacrylic acid is especially preferred.

As the hydrophobic monomer (b) used for the water-insoluble polymer (y), preferred are styrene and benzyl (meth) acrylate, and more preferred is styrene, from the viewpoint of enhancing an affinity of the polymer to the colorant. In addition, from the viewpoint of enhancing an affinity to the water-soluble polymer (x), the component (b) used for the water-insoluble polymer (y) is preferably the same as that used for the water-soluble polymer (x).

The water-insoluble polymer (y) may further optionally contain a constitutional unit derived from (c) a macromer (hereinafter occasionally referred to merely as a "component (c)"), and preferably contains all of the constitutional unit derived from the component (a), the constitutional unit derived from the component (b) and the constitutional unit derived from the component (c).

[(c) Macromer]

The macromer (c) is in the form of a compound which contains a polymerizable functional group at one terminal end thereof and has a number-average molecular weight of from 500 to 100,000, and can be used for enhancing an affinity of the polymer to the colorant. It is considered that when the polymer has a high affinity to the colorant, the polymer particles are enhanced in dispersibility, so that the water-based ink containing the polymer particles can be improved in ejection property. The polymerizable functional group bonded to one terminal end of the macromer is preferably an acryloyloxy group or a methacryloyloxy group, and more preferably a methacryloyloxy group. The macromer (c) has a number-average molecular weight of from 500 to 100,000 and preferably from 1,000 to 10,000. Meanwhile, the number-average molecular weight of the macromer (c) may be measured by gel chromatography using chloroform containing 1 mmol/L of dodecyl dimethylamine as a solvent and using polystyrene as a standard substance.

As the macromer (c), from the viewpoint of enhancing an affinity of the polymer to the colorant, there are preferably used a styrene-based macromer, an aromatic group-containing (meth)acrylate-based macromer and a silicone-based macromer.

Examples of the styrene-based macromer include homopolymers of styrene-based monomers, and copolymers of the styrene-based monomers with other monomers. When the styrene-based macromer is in the form of the above copolymer, from the viewpoint of enhancing an affinity of the polymer to the colorant, the content of the styrene-based monomer therein is preferably 50% by weight or more, and more preferably 70% by weight or more. Examples of the other monomers to be copolymerized with the styrene-based monomers include aromatic group-containing (meth)acrylates and acrylonitrile. Examples of the styrene-based monomers include styrene and 2-methyl styrene.

Specific examples of the styrene-based macromer include "AS-6(S)", "AN-6(S)" and "HS-6(S)" (tradenames all available from Toagosei Co., Ltd.), etc.

As the aromatic group-containing (meth)acrylate-based macromers, there may be used homopolymers of an aromatic group-containing (meth)acrylate or copolymers of the aromatic group-containing (meth)acrylate with other monomers. When the aromatic group-containing (meth)acrylate-based macromer is in the form of the above copolymer, from the viewpoint of enhancing an affinity of the polymer to the colorant, the content of the aromatic group-containing (meth)acrylate-based macromer therein is preferably 50% by weight or more, and more preferably 70% by weight or more. Examples of the aromatic group-containing (meth)acrylate include (meth)acrylates containing an arylalkyl group or aryl group having 7 to 12 carbon atoms which may have a substituent group containing a hetero atom. Examples of the aromatic group-containing (meth)acrylate include benzyl (meth)acrylate and phenoxyethyl (meth)acrylate. Among these aromatic group-containing (meth)acrylates, preferred is benzyl (meth)acrylate. Examples of the other monomers to be copolymerized with the aromatic group-containing (meth) acrylate include styrene-based monomers and acrylonitrile.

The macromer (c) may be a silicone-based macromer. Examples of the silicone-based macromer include organopolysiloxanes containing a polymerizable functional group bonded to one terminal end thereof.

The macromer (c) used for the water-insoluble polymer (y) is preferably a polymer of the same monomer as the hydrophobic monomer (b) used for the water-soluble polymer (x) and more preferably the styrene-based macromer from the viewpoint of enhancing an affinity of the water-insoluble polymer (y) to the water-soluble polymer (x).

[(d) Nonionic Monomer]

The monomer mixture may further contain (d) a nonionic monomer (hereinafter occasionally referred to merely as a "component (d)").

Examples of the component (d) include 2-hydroxyethyl (meth)acrylate, 3-hydroxypropyl (meth)acrylate, polyethylene glycol (n=2 to 30 wherein n represents an average molar number of addition of oxyalkylene groups: hereinafter defined in the same way) (meth)acrylate, polypropylene glycol (n=2 to 30) (meth)acrylate, poly(ethylene glycol (n=1 to 15)/propylene glycol (n=1 to 15) (meth)acrylate, methoxy-polyethylene glycol (n=1 to 30) (meth)acrylate, methoxy-polytetramethylene glycol (n=1 to 30) (meth)acrylate, ethoxy-polyethylene glycol (n=1 to 30) (meth)acrylate, octoxy-polyethylene glycol (n=1 to 30) (meth)acrylate, polyethylene glycol (n=1 to 30) (meth)acrylate 2-ethylhexy ether, (iso)propoxy-polyethylene glycol (n=1 to 30) (meth)acrylate, butoxy-polyethylene glycol (n=1 to 30) (meth)acrylate, methoxy-polypropylene glycol (n=1 to 30) (meth)acrylate and methoxy(ethylene glycol/propylene glycol copolymer) (n in total=1 to 30 in which n of ethylene glycol: 1 to 29) (meth)acrylate.

Specific examples of commercially available products of the component (d) include "NK ESTER M-40G", "NK ESTER M-90G" and "NK ESTER M-230G" all available from Shin-Nakamura Chemical Co., Ltd.; and "BLEMMER PE-90", "BLEMMER PE-200", "BLEMMER PE-350", "BLEMMER PME-100", "BLEMMER PME-200", "BLEMMER PME-400", "BLEMMER PME-1000", "BLEMMER PP-500", "BLEMMER PP-800", "BLEMMER PP-1000", "BLEMMER AP-150", "BLEMMER AP-400", "BLEMMER AP-550", "BLEMMER AP-800", "BLEMMER 50PEP-300", "BLEMMER 50POEP-800B" and "BLEMMER 43PAPE-600B" all available from NOF Corporation.

These components (a) to (d) are respectively used alone or in the form of a mixture of any two or more thereof.

The contents of the respective constitutional units derived from the above components (a) to (d) in the water-insoluble polymer (y) are as follows.

The content of the constitutional unit derived from the component (a) is preferably from 4 to 40% by weight, more preferably from 5 to 30% by weight, still more preferably from 10 to 30% by weight and especially preferably from 10 to 25% by weight from the viewpoint of enhancing a dispersibility of the polymer particles.

The content of the constitutional unit derived from the component (b) is preferably from 5 to 98% by weight and more preferably from 10 to 60% by weight from the viewpoint of enhancing an affinity of the polymer to the colorant.

The content of the constitutional unit derived from the component (c) is preferably from 1 to 25% by weight and more preferably from 5 to 20% by weight from the viewpoint of enhancing an affinity of the polymer to the colorant.

The content of the constitutional unit derived from the component (d) is preferably from 5 to 60% by weight and more preferably from 17 to 50% by weight from the viewpoint of enhancing a dispersibility of the polymer particles.

The water-insoluble polymer (y) preferably has a weight-average molecular weight of from 5,000 to 500,000, more preferably from 10,000 to 400,000, still more preferably from 10,000 to 300,000 and especially preferably from 20,000 to 300,000 from the viewpoint of a good storage stability of the resulting water-based ink. Meanwhile, the weight-average molecular weight of the polymer may be measured by the method described in Examples below.

[Production of Polymers]

The water-soluble polymer (x) and the water-insoluble polymer (y) used in the present invention (both the polymers are hereinafter occasionally generally referred to merely as "polymers") may be respectively produced by copolymerizing the monomer mixture by known methods such as bulk polymerization, solution polymerization, suspension polymerization and emulsion polymerization. Among these polymerization methods, preferred is the solution polymerization.

The solvent used in the solution polymerization method is preferably an polar organic solvent. The polar organic solvent miscible with water may be used in the form of a mixture with water. Examples of the polar organic solvents include aliphatic alcohols having 1 to 3 carbon atoms; ketones having 3 to 8 carbon atoms; esters such as ethyl acetate; and mixed solvents of at least one of the compounds with water.

The polymerization may be carried out in the presence of a conventionally known radical polymerization initiator such as azo compounds and organic peroxides. The amount of the radical polymerization initiator to be used in the polymerization is preferably from 0.001 to 5 mol and more preferably from 0.01 to 2 mol per 1 mol of the monomer mixture.

The polymerization may also be carried out in the presence of a conventionally known chain transfer agent, e.g., mercaptans such as octyl mercaptan and 2-mercapto ethanol, and thiuram disulfides.

The polymerization conditions of the monomer mixture may vary depending upon the kinds of radical polymerization initiator, monomers, solvent, etc., to be used in the polymerization reaction, and therefore are not particularly limited. The polymerization is generally conducted at a temperature of preferably from 30 to 100° C. and more preferably from 50 to 80° C. The polymerization time is preferably from 1 to 20 h. Further, the polymerization is preferably conducted in a nitrogen atmosphere or in an atmosphere of an inert gas such as argon.

After completion of the polymerization reaction, the polymer thus produced may be isolated from the reaction solution by a known method. The thus obtained polymer may be purified by repeated reprecipitation, membrane separation, chromatography, extraction, etc., for removing unreacted monomers, etc., therefrom.

In the present invention, the polymers are preferably used after the salt-forming group derived from the salt-forming group-containing monomer (a) is neutralized with a neutralizing agent. When the salt-forming group is an anionic group, as the neutralizing agent, there may be used, for example, bases such as sodium hydroxide, potassium hydroxide and various amines.

The degree of neutralization of the salt-forming group contained in the polymers is preferably from 10 to 300%, more preferably from 20 to 200% and still more preferably from 30 to 150% from the viewpoint of a good dispersion stability of the polymer particles (A) in the resulting ink.

When the polymers are crosslinked, the degree of neutralization of the salt-forming group contained in the polymers before being crosslinked is preferably from 10 to 90%, more preferably from 20 to 80% and still more preferably from 30 to 70% from the viewpoint of a good dispersion stability of the polymer particles (A) in the resulting ink.

The degree of neutralization of the anionic salt-forming group is calculated according to the following formula:

$$\{[\text{weight(g) of neutralizing agent/equivalent of neutralizing agent}]/[\text{acid value of polymer(mg KOH/g)} \times \text{weight(g) of polymer}/(56 \times 1000)]\} \times 100$$

The acid value may be calculated from the respective constitutional units of the polymers, or may also be determined by the method of subjecting a solution prepared by dissolving the polymers in an appropriate solvent (such as, for example, methyl ethyl ketone) to titration.

The acid value of the water-insoluble polymer is preferably 30 (mg KOH/g) or more and more preferably 40(mg KOH/g) or more form the viewpoint of a good dispersibility of the polymer. In addition, from the viewpoint of allowing the resulting ink to exhibit a high optical density, the acid value of the water-insoluble polymer is preferably 200 (mg KOH/g) or less and more preferably 150 (mg KOH/g) or less. From these viewpoints, the acid value of the water-insoluble polymer is preferably from 30 to 200 (mg KOH/g) and more preferably from 40 to 150 (mg KOH/g).

[Colorant-Containing Polymer Particles]

The colorant-containing polymer particles (A) (hereinafter occasionally referred to merely as "polymer particles (A)") are obtained by dispersing the colorant with the water-soluble polymer (x) and the water-insoluble polymer (y). When the water-soluble polymer (x) and the water-insoluble polymer (y) are used in combination with each other as a dispersant for the colorant, the resulting water-based ink for ink-jet printing is excellent in ejection property and optical density and exhibits a low viscosity, and further has an excellent storage stability.

The weight ratio of the colorant to the water-soluble polymer (x) used for dispersing the colorant [colorant/water-soluble polymer (x)] is preferably from 12 to 25, more preferably from 12 to 22, still more preferably from 12 to 20, further still more preferably from 12 to 18 and especially preferably from 12 to 15 from the viewpoint of a good dispersion stability of the resulting dispersion.

The weight ratio of the colorant to a sum of the water-soluble polymer (x) and the water-insoluble polymer (y) used for dispersing the colorant [colorant/[(x)+(y)]] is preferably from 50/50 to 95/5, more preferably from 60/40 to 95/5 and still more preferably from 70/30 to 95/5 from the viewpoints of enhancing an optical density of the resulting ink.

The weight ratio of the water-insoluble polymer (y) to the water-soluble polymer (x) [(y)/(x)] is from 2.0 to 5.0, preferably from 2.5 to 5.0, more preferably from 3.0 to 5.0 and especially preferably from 3.0 to 4.0 from the viewpoints of a high optical density, a low viscosity and a good ejection property of the resulting ink.

The polymer particles (A) are preferably produced in the form of a water dispersion thereof by the below-mentioned production process of the water-based ink including the steps (i) and (ii) from the viewpoint of a high production efficiency.

[Colorant-Containing Crosslinked Polymer Particles]

The colorant-containing crosslinked polymer particles used in the present invention preferably contain a crosslinked polymer obtained by subjecting the water-soluble polymer (x) and the water-insoluble polymer (y) to crosslinking treatment from the viewpoint of enhancing an optical density of the resulting ink while maintaining a low viscosity thereof.

The crosslinking rate (mol %) of the crosslinked polymer is preferably from 10 to 90 mol %, more preferably from 20 to 80 mol % and still more preferably from 30 to 70 mol %. The crosslinking rate may be determined by the below-mentioned method.

The crosslinked polymer particles are preferably produced in the form of a dispersion thereof by the below-mentioned production process of the water-based ink further including the step (iii) from the viewpoint of a high production efficiency.

[Production of Water-Based Ink for Ink-Jet Printing]

The water-based ink for ink-jet printing containing the colorant-containing polymer particles (A) according to the present invention is efficiently produced by the process including the following steps (i) and (ii). Also, by using the process further including the step it is possible to efficiently produce the water-based ink for ink-jet printing which includes the crosslinked polymer particles containing the crosslinked polymer obtained by subjecting the water-soluble polymer (x) and the water-insoluble polymer (y) to crosslinking treatment.

Step (i): dispersing the colorant with the water-soluble polymer (x) and water to obtain a water dispersion.

Step (ii): adding the water-insoluble polymer (y) to the water dispersion obtained in the step (i) and further dispersing the resulting mixture to obtain a dispersion containing the colorant-containing polymer particles (A).

Step (iii): subjecting the dispersion obtained in the step (ii) or a water dispersion obtained by removing the solvent from the dispersion to crosslinking treatment.

The water-based ink for ink-jet printing according to the present invention can be produced by adding a water-soluble organic solvent (B), if required, together with additives ordinarily used for the water-based ink such as a wetting agent, to the dispersion obtained through the steps (i) and (ii) or the steps (i) to (iii).

Step (i)

In the step (i), the colorant is dispersed with the water-soluble polymer (x) to prepare a water dispersion. According to the preferred method for the step (i), the water-soluble polymer (x), the colorant and water, if required, together with optional additives such as a neutralizing agent and a surfactant, are first mixed with each other to obtain a mixture, and then the resulting mixture is dispersed using a dispersing device.

The content of the colorant in the mixture is preferably from 5 to 50% by weight and more preferably from 7 to 40% by weight; the content of an organic solvent in the mixture is preferably from 2 to 40% by weight and more preferably from 3 to 30% by weight; the content of the water-soluble polymer (x) in the mixture is preferably from 0.2 to 10% by weight and more preferably from 0.3 to 8% by weight; and the content of water in the mixture is preferably from 20 to 90% by weight and more preferably from 30 to 90% by weight.

When neutralized using a neutralizing agent, the neutralization treatment is preferably carried out such that the finally obtained water dispersion has a pH value of from 7 to 11. Examples of the neutralizing agent include bases such as sodium hydroxide, potassium hydroxide and various amines. Also, the water-soluble polymer (x) may be previously neutralized.

The method for dispersing the mixture in the step (i) is not particularly limited. The colorant particles in the mixture may be finely divided into fine particles having a desired average particle size only by a substantial dispersion procedure. Preferably, the mixture is first subjected to a preliminary dispersion procedure, and then to the substantial dispersion procedure by applying a shear stress thereto so as to control the average particle size of the colorant particles to a desired value. The dispersion procedure in the step (i) is preferably conducted at a temperature of from 5 to 50° C. and more preferably from 5 to 35° C. The dispersing time is preferably from 1 to 30 h and more preferably from 1 to 25 h.

When subjecting the mixture to the preliminary dispersion procedure, there may be used ordinary mixing or stirring devices such as anchor blades and disper blades. Specific examples of the preferred mixing or stirring devices include high-speed stirring mixers such as "Ultra Disper" and "Dispamill" (tradenames: both available from Asada Iron Works Co., Ltd.), "Milder" (tradename: available from Ebara Corporation and Pacific Machinery & Engineering Co., Ltd.), and "TK Homo Mixer", "TK Pipeline Mixer", "TK Homo Jetter", "TK Homomic Line Flow" and "Filmix" (tradenames: all available from Primix Corporation).

As a means for applying a shear stress to the mixture in the substantial dispersion procedure, there may be used, for example, kneading machines such as roll mills, kneaders and extruders, homo-valve-type high-pressure homogenizers such as typically "High-Pressure Homogenizer" (tradename: available from Izumi Food Machinery Co., Ltd.), chamber-type high-pressure homogenizers such as "Microfluidizer" (tradename: available from Microfluidics Inc.), "Nanomizer" (tradename: available from Yoshida Kikai Co., Ltd.) and "Altimizer" and "Starburst" (tradenames: both available from Sugino Machine Limited), and media dispersing devices such as a paint shaker and a beads mill. Examples of commercially available products of the media dispersing devices include "Ultra Apex Mill" (tradename: available from Kotobuki Industries Co., Ltd.), "Pico Mill" (tradename: available from Asada Iron Works Co., Ltd.), and "Dyno-Mill" (tradename: available from Shinmaru Enterprises Corporation). These apparatuses may be used in combination of any two or more thereof. Among these apparatuses, the media dispersing devices are preferably used in view of reducing a particle size of the colorant particles and stabilizing the dispersion.

Step (ii)

In the step (ii), the water-insoluble polymer (y) is added to the water dispersion obtained in the step (i), and the resulting mixture is further dispersed to obtain a dispersion containing the colorant-containing polymer particles (A). From the viewpoint of a good storage stability of the resulting water-based ink, the step (ii) is preferably carried out such that the water dispersion obtained in the step (i) is mixed with a dispersion of the water-insoluble polymer (y) containing the water-insoluble polymer (y), the organic solvent and water, i.e., an emulsion of the water-insoluble polymer (y) containing the organic solvent, and the resulting mixture is dispersed to obtain a dispersion containing the colorant-containing polymer particles (A) in an emulsified state.

In the dispersion obtained in the step (ii), the content of the colorant therein is preferably from 5 to 50% by weight and more preferably from 6 to 40% by weight; the content of the water-insoluble polymer (y) therein is preferably from 1 to 40% by weight and more preferably from 1 to 20% by weight; the content of the water-soluble polymer (x) therein is preferably from 0.1 to 20% by weight and more preferably from 0.2 to 10% by weight; the content of the organic solvent therein is preferably from 3 to 50% by weight and more preferably from 3 to 30% by weight; and the content of water therein is preferably from 30 to 90% by weight and more preferably from 50 to 85% by weight. The pH value of the dispersion obtained in this step is preferably adjusted to from 7 to 10.

The weight ratio of the colorant to the water-insoluble polymer (y) [colorant/water-insoluble polymer (y)] in the dispersion obtained in the above step is preferably from 1.0 to 20.0, more preferably from 1.0 to 10.0 and still more preferably from 1.0 to 6.0 from the viewpoint of a good dispersion stability of the polymer particles (A) in the resulting ink.

The emulsion of the water-insoluble polymer (y) containing the organic solvent may be prepared by the following method. That is, the water-insoluble polymer (y) is first dissolved in the organic solvent, and the resulting solution is successively charged with a neutralizing agent and then water, if required further with a surfactant, etc., and the resulting dispersion is stirred and mixed until an oil-in-water type emulsified product (emulsion) containing emulsified particles having a desired average particle size are obtained. When the polymer is hardly emulsified, a mechanical force may be applied to the dispersion, if required, using a high-speed stirrer, a dispersing device, etc., such that the particle size of the obtained emulsified particles lies within the range of from 0.01 to 2 μm.

As the emulsifying method, there may be used a phase-transfer method and a normal phase method. More specifically, there may be used the method in which a mixed solution of water and a neutralizing agent is first prepared, and then a mixed solution of the water-insoluble polymer (y) and the organic solvent is dropped to the mixed solution, or the method in which a mixture of the water-insoluble polymer (y), the organic solvent and the neutralizing agent is dropped into water, or the like. The temperature used upon the emulsification is preferably 40° C. or lower and more preferably 30° C. or lower from the viewpoints of a well-controlled particle size of the emulsified particles and a stable viscosity of the emulsion. The ratios between the respective components in the emulsion may be controlled such that the content of the organic solvent therein is preferably from 5 to 40% by weight and more preferably from 10 to 30% by weight; the content of the water-insoluble polymer (y) therein (in terms of a solid content) is preferably from 2 to 40% by weight and more preferably from 3 to 30% by weight; and the content of water therein is preferably from 50 to 90% by weight and more preferably from 55 to 85% by weight.

When the polymer is neutralized with the neutralizing agent, the degree of neutralization is preferably controlled such that the finally obtained water dispersion has a pH value of from 7 to 11. In addition, the anionic polymer may be previously neutralized.

Examples of the organic solvent include alcohol solvents such as ethanol, isopropanol and isobutanol; ketone solvents such as acetone, methyl ethyl ketone, methyl isobutyl ketone and diethyl ketone; and ether solvents such as dibutyl ether, tetrahydrofuran and dioxane. These organic solvents may be used alone or in combination of any two or more thereof.

The solubility of the organic solvent in 100 g of water as measured at 20° C. is preferably 5 g or more, and more preferably 10 g or more. Among these organic solvents, preferred are methyl ethyl ketone and methyl isobutyl ketone.

The method for dispersing the mixture in the step (ii) is not particularly limited similarly to the step (i). The polymer particles may be finely divided into fine particles having a desired average particle size only by a substantial dispersion procedure. Preferably, the mixture is first subjected to a preliminary dispersion procedure, and then to the substantial dispersion procedure by applying a shear stress thereto. The dispersion procedure in the step (ii) is preferably conducted at a temperature of from 5 to 50° C. and more preferably from 5 to 35° C. The dispersing time is preferably from 1 to 30 h and more preferably from 2 to 25 h.

When subjecting the mixture to the preliminary dispersion procedure, there may be used the same mixing or stirring devices as described above, etc.

As a means for applying a shear stress to the mixture in the substantial dispersion procedure, there may be used the same kneading machines, high-pressure homogenizers and media dispersing devices as described above. Among these apparatuses, the high-pressure homogenizers are preferably used in view of reducing a particle size of the polymer particles (A) and stabilizing the dispersion.

(Solvent Removal Step)

In the above process for producing the water-based ink according to the present invention, subsequent to the step (ii), there may be further carried out an optional step in which the organic solvent is removed by distillation from the dispersion containing the polymer particles (A) which is obtained in the step (ii), by known methods to render the dispersion aqueous, thereby obtaining a water dispersion of the polymer particles (A). This step may be carried out after completion of the step (ii).

The organic solvent is preferably substantially completely removed from the thus obtained water dispersion of the polymer particles (A). However, the residual organic solvent may be present in the water dispersion unless the objects and effects of the present invention are adversely affected by the residual organic solvent. When subsequently subjecting the water dispersion to the crosslinking step, the residual organic solvent may also be removed from the water dispersion obtained after subjected to crosslinking reaction, if required. The content of the residual organic solvent in the finally obtained water dispersion of the polymer particles (A) is preferably 0.1% by weight or less and more preferably 0.01% by weight or less.

In addition, if required, the dispersion may be subjected to heating and stirring treatments before removing the organic solvent by distillation.

In the thus-obtained water dispersion of the polymer particles (A), solid components of the polymer are dispersed in an aqueous medium containing water as a main medium. The configuration of the polymer particles (A) is not particularly limited, and the polymer particles (A) may have any configuration as long as the particles are formed from at least the colorant and the polymer. Examples of the configuration of the polymer particles (A) include the particle configuration in which the colorant is enclosed in the polymer, the particle configuration in which the colorant is uniformly dispersed in the polymer, and the particle configuration in which the colorant is exposed onto a surface of the respective polymer particles.

Step (iii)

In the step the dispersion of the polymer particles (A) obtained in the step (ii) or the water dispersion obtained by removing the solvent from the dispersion is subjected to crosslinking treatment. In the step a crosslinking agent is added to the dispersion of the polymer particles (A) obtained in the step (ii) or the water dispersion of the polymer particles (A) obtained by removing the solvent from the dispersion obtained in the step (ii) if the solvent is contained therein, to thereby obtain a water dispersion containing crosslinked polymer particles produced by subjecting the water-soluble polymer (x) and the water-insoluble polymer (y) to crosslinking treatment. The step (iii) is preferably carried out from the viewpoints of reducing a viscosity of the resulting water-based ink and enhancing an optical density thereof.

When the polymers are crosslinked by mixing the dispersion of the colorant-containing polymer particles (A) obtained in the step (ii) with the crosslinking agent, the dispersion of the crosslinked polymer particles obtained in the crosslinking treatment may be subjected to the same solvent removal step as described above to remove the organic solvent from the dispersion, thereby obtaining the water dispersion as aimed.

The crosslinking agent used in the above step is preferably in the form of a compound containing a functional group capable of reacting with the salt-forming group of the polymers, more preferably a compound containing the two or more functional groups in a molecule thereof, and still more preferably a compound containing the 2 to 6 functional groups in a molecule thereof.

In order to allow the polymers to efficiently undergo the crosslinking reaction on their surface, the solubility of the crosslinking agent in 100 g of water at 25° C. is preferably 50 g or less, more preferably 40 g or less and still more preferably 30 g or less. The molecular weight of the crosslinking agent is preferably from 120 to 2000, more preferably from 150 to 1500 and still more preferably from 150 to 1000 in view of a low viscosity and a high optical density of the resulting ink.

From the viewpoints of reducing a viscosity of the resulting ink and enhancing an ejection property and an optical density thereof, the steps (i) to (iii) may be suitably carried out, for example, in the following manner. That is, an anionic group-containing (preferably a carboxyl group-containing) water-soluble polymer (x) as the water-soluble polymer (x) and an anionic group-containing (preferably a carboxyl group-containing) water-insoluble polymer (y) as the water-insoluble polymer (y) are subjected to crosslinking treatment using a crosslinking agent having two or more functional group capable of reacting with the anionic groups in a molecule thereof to obtain a water dispersion containing colorant-containing crosslinked polymer particles which are produced by subjecting the water-soluble polymer (x) and the water-insoluble polymer (y) to the crosslinking treatment. Thus, it is possible to subject both the water-soluble polymer and the water-insoluble polymer to the crosslinking treatment, so that the resulting ink exhibits a reduced viscosity and is enhanced in ejection property and an optical density. The reason therefor is considered to be that the anionic group of the water-soluble polymer (x) is crosslinked with the anionic group of the water-insoluble polymer (y) so that elution of the water-soluble polymer (x) from the colorant is effectively prevented.

(Crosslinking Agent)

Examples of the suitable crosslinking agent include the following compounds (a) to (c):

(a) Compounds containing two or more epoxy groups in a molecule thereof:

Examples of the compounds containing two or more epoxy groups include polyglycidyl ethers such as ethylene glycol diglycidyl ether, polyethylene glycol diglycidyl ether, polypropylene glycol diglycidyl ether, glycerol triglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ether.

(b) Compounds containing two or more oxazoline groups in a molecule thereof:

Examples of the compounds containing two or more oxazoline groups include bisoxazoline compounds such as 2,2'-bis(2-oxazoline), 1,3-phenylene-bisoxazoline and 1,3-benzobisoxazoline, and compounds containing an end oxazoline group obtained by reacting the bisoxazoline compound with a polybasic carboxylic acid.

(c) Compounds containing two or more isocyanate groups in a molecule thereof:

Examples of the compounds containing two or more isocyanate groups include organic polyisocyanates and isocyanate-terminated prepolymers.

Among these crosslinking agents, preferred are the compounds (a) containing two or more epoxy groups in a molecule thereof, and more preferred are ethylene glycol diglycidyl ether and trimethylolpropane polyglycidyl ether.

The amount of the crosslinking agent used in the crosslinking treatment is adjusted such that the weight ratio of the crosslinking agent to the polymers [crosslinking agent/polymers] is preferably from 0.1/100 to 50/100, more preferably from 0.5/100 to 40/100, still more preferably from 1/100 to 30/100 and especially preferably from 2/100 to 25/100 from the viewpoint of a low viscosity of the resulting ink owing to the polymer particles (A) in the ink.

The amount of the crosslinking agent used is also adjusted such that the molar amount of a reactive group in the crosslinking agent which is capable of reacting with 1 g of the polymer is preferably from 0.01 to 10 mmol, more preferably from 0.05 to 5 mmol and still more preferably from 0.1 to 2 mmol.

The crosslinked polymer contained in the water dispersion of the crosslinked polymer particles obtained in the step (iii) preferably contains a neutralized salt-forming group (preferably a carboxyl group) in an amount of 0.5 mmol or more per 1 g of the crosslinked polymer. It is considered that such a crosslinked polymer is dissociated in the water dispersion and contributes to stabilization of the colorant-containing crosslinked polymer particles owing to charge repulsion between the salt-forming groups.

The crosslinking rate (mol %) of the crosslinked polymer as determined from the following calculation formula is preferably from 10 to 90 mol %, more preferably from 20 to 80 mol % and still more preferably from 30 to 70 mol %. The crosslinking rate may be determined from the amount of the crosslinking agent used and the number of moles of the reactive group thereof as well as the amount of the polymer used and the number of moles of the reactive group thereof which is capable of reacting with the reactive group of the crosslinking agent.

Crosslinking Rate(mol %)=[(number of moles of reactive group of crosslinking agent)/(number of moles of reactive group of polymer capable of reacting with reactive group of crosslinking agent)]×100

In the above calculation formula, the "number of moles of reactive group of crosslinking agent" is the value obtained by multiplying the number of moles of the crosslinking agent used by the number of the reactive groups contained in a molecule of the crosslinking agent.

<Water-Based Ink for Ink-Jet Printing>

The water-based ink for ink-jet printing according to the present invention contains the water dispersion of the colorant-containing polymer particles (A) which is obtained by dispersing the colorant with the water-soluble polymer (x) and the water-insoluble polymer (y), or the water dispersion of the crosslinked polymer particles obtained by subjecting the water-soluble polymer (x) and the water-insoluble polymer (y) contained in the polymer particles (A) to crosslinking treatment.

The water-based ink for ink-jet printing according to the present invention further contains the water-soluble organic solvent (B). In addition, in order to prevent drying of the ink upon storage, etc., various additives ordinarily used in water-based inks for ink-jet printing such as wetting agents, penetrants, dispersants, surfactants, viscosity modifiers, defoaming agents, antiseptic agents, mildew-proof agents and rust preventives may be added to the water-based ink.

<Water-Soluble Organic Solvent (B)>

The water-based ink for ink-jet printing according to the present invention contains the water-soluble organic solvent (B) in an amount of from 10 to 70% by weight from the viewpoints of a good ejection property and a high optical density thereof.

The reason why the ink containing the water-soluble organic solvent is enhanced in ejection property and optical density is considered as follows although not clearly determined. That is, when using the water-soluble organic solvent, in particular, a relatively hydrophobic water-soluble organic solvent having a solubility parameter of from 0.5 to 15.0, elution of the water-soluble polymer from the colorant can be suppressed, and adhesion of the polymer onto the surface of the colorant can be promoted, whereby the resulting ink can be enhanced in ejection property, and further since the particles themselves can be hydrophobilized to some extent, it is considered that coagulation of the ink ejected on the surface of a recording paper is promoted, resulting in enhancement of an optical density thereof.

The water-soluble organic solvent (B) is not particularly limited, and any water-soluble organic solvent may be used as long as it is uniformly miscible with water at an optional proportion. Specific examples of the water-soluble organic solvent (B) include aliphatic alcohols having 1 to 3 carbon atoms such as ethanol and methanol; aliphatic ketones having 1 to 3 carbon atoms such as acetone and methyl ethyl ketone; alkanediols having 2 to 8 carbon atoms such as ethylene glycol, 1,2-hexanediol, 3-methyl-1,3-butanediol and 2-ethyl-1,3-hexanediol; polyalkylene ($C_2$ to $C_4$) glycol alkyl ($C_2$ to $C_6$) ethers such as triethylene glycol monobutyl ether; glycerol; dioxane; and 2-pyrrolidone.

The content of the water-soluble organic solvent (B) used in the present invention in the water-based ink is from 10 to 70% by weight, preferably from 10 to 50% by weight and more preferably from 15 to 25% by weight from the viewpoints of a good ejection property and a high optical density of the resulting ink.

The water-soluble organic solvent (B) preferably has a solubility parameter of from 5.0 to 15.0. Meanwhile, the solubility parameter is the value (unit: $(cal/cm^3)^{1/2}$) calculated by Fedors' method (see Robert F. Fedors, "Polymer Engineering and Science", 14, 147-154 (1974)).

Specific examples of the water-soluble organic solvent (B) having a solubility parameter of from 5.0 to 15.0 are as follows (in which respective numerals in parentheses indicate a solubility parameter).

Specific examples of the aliphatic ketones include acetone (8.85), methyl ethyl ketone (8.80) and dibutyl ketone (8.72). Specific examples of the alkanediols include 1,2-hexanediol, 3-methyl-1,3-butanediol (13.59) and 2-ethyl-1,3-hexanediol (12.20). Specific examples of the polyalkylene glycol alkyl ethers include triethylene glycol monobutyl ether (10.21). Specific examples of the other solvents include dioxane (9.12) and 2-pyrrolidone (13.66). Among these water-soluble organic solvents, from the viewpoint of a high optical density of the resulting ink, preferred are 1,2-hexanediol (13.15), 2-pyrrolidone (13.66) and triethylene glycol monobutyl ether (10.21), and more preferred is triethylene glycol monobutyl ether.

The content of the water-soluble organic solvent (B) having a solubility parameter of from 5.0 to 15.0 in the water-based ink is preferably from 3 to 70% by weight, more preferably from 10 to 50% by weight and still more preferably from 15 to 25% by weight. In addition, from the viewpoint of a high optical density of the resulting ink, it is desirable that the water-soluble organic solvent (B) preferably having a solubility parameter of from 6.0 to 14.0 and more preferably from 8.0 to 14.0 is contained in the water-based ink in an amount of from 3 to 70% by weight, more preferably from 10 to 50% by weight and still more preferably from 15 to 25% by weight.

The weight ratio of the water-soluble polymer (x) to the water-soluble organic solvent (B) having a solubility parameter of from 5.0 to 15.0 [(water-soluble polymer (x))/(water-soluble organic solvent (B) having a solubility parameter of from 5.0 to 15.0)] is preferably from 1/60 to 1/2, more preferably from 1/50 to 1/3 and still more preferably from 1/40 to 1/5 from the viewpoints of reducing a viscosity of the resulting ink and enhancing an ejection property thereof.

The content of the respective components in the water-based ink according to the first invention are as follows.

The content of the colorant contained in the polymer particles (A) in the water-based ink is preferably from 1 to 25% by weight, more preferably from 2 to 20% by weight, still more preferably from 4 to 15% by weight and further still more preferably from 5 to 12% by weight from the viewpoint of enhancing an optical density of the resulting ink. The content of water in the water-based ink is preferably from 20 to 90% by weight, more preferably from 30 to 80% by weight and still more preferably from 40 to 70% by weight.

The weight ratio of the colorant to the water-soluble polymer (x) in the polymer particles [colorant/water-soluble polymer (x)] is preferably from 12 to 25, more preferably from 12 to 22, still more preferably from 12 to 20, further still more preferably from 12 to 18 and especially preferably from 12 to 15 from the viewpoints of a low viscosity and a high optical density of the resulting ink.

The weight ratio of the water-insoluble polymer (y) to the water-soluble polymer (x) [(y)/(x)] is preferably from 2.0 to 5.0, more preferably from 2.5 to 5.0, still more preferably from 3.0 to 5.0 and further still more preferably from 3.0 to 4.0 from the viewpoints of a high optical density and a low viscosity of the resulting ink.

The weight ratio of the water-soluble organic solvent (B) to the water-soluble polymer (x) [(B)/(x)] is preferably from 15 to 50, more preferably from 21 to 35 and still more preferably from 28 to 30 from the viewpoint of enhancing an optical density and an ejection property of the resulting ink.

In the present specification, when subjecting the water-soluble polymer (x) and the water-insoluble polymer (y) to crosslinking treatment using the crosslinking agent, the weight ratios of the water-soluble polymer (x) and the water-insoluble polymer (y) are respectively calculated based on the weights of the polymers inclusive of that of the crosslinking agent. In this case, assuming that the crosslinking agent is reacted 100%, the weight of the crosslinking agent is divided and shared by the respective polymers according to the weight ratios of the water-soluble polymer (x) and the water-insoluble polymer (y).

The ink-jet printing method to which the water-based ink of the first invention is applicable is not particularly limited. However, the water-based ink of the first invention is more suitably applied to a piezoelectric-type ink-jet printer which is suitable for ejecting a dispersion containing a dispersed coloring material such as a colorant and particles such as polymer particles.

<Second Invention>

The second invention relates to a process for producing a water dispersion for ink-jet printing which is capable of exhibiting a high optical density suitable for high-speed printing, a water dispersion for ink-jet printing, and a water-based ink.

The present inventors have found that when a colorant dispersion and a water-insoluble polymer emulsion are mixed and dispersed, the resulting water dispersion can exhibit a high optical density even upon high-speed printing on a plain paper.

The process for producing a water dispersion for ink-jet printing according to the second invention includes the following steps (I) to (III).

Step (I): mixing a dispersion of a colorant with an emulsion of a water-insoluble polymer containing an organic solvent;

Step (II); subjecting a mixture obtained in the step (I) to dispersing treatment to obtain a dispersion of the colorant onto which the water-insoluble polymer (y') is deposited; and Step (III): removing the organic solvent from the dispersion obtained in the step (II).

In the following, the respective components, the respective steps and the like used in the second invention are explained.

[Dispersion of Colorant]

The colorant dispersion is preferably in the form of a dispersion containing at least the colorant, the water-soluble polymer (x') and water. The colorant dispersion is preferably prepared by dispersing these components using a media dispersing device, etc., and is more preferably in the form of a pigment dispersion prepared by dispersing a pigment using a media dispersing device, etc.

<Colorant>

The colorant used in the colorant dispersion is preferably a pigment or a hydrophobic dye in view of a good water resistance. Among these colorants, to meet the recent strong demand for a high weather resistance, preferred is the pigment. The pigment may be either organic or inorganic. The organic or inorganic pigment may be used in combination with an extender pigment, if required.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments and quinophthalone pigments.

Specific examples of the preferred organic pigments include one or more pigments selected from the group consisting of C.I. Pigment Yellow, C.I. Pigment Red, C.I. Pigment Violet, C.I. Pigment Blue and C.I. Pigment Green, etc., with various product numbers. In addition, there may also be used solid solution pigments such as quinacridone solid solution pigments.

Examples of the inorganic pigment include carbon blacks, metal oxides, metal sulfides and metal chlorides. Among these inorganic pigments, carbon blacks are preferably used for black water-based inks. The carbon blacks may include furnace blacks, thermal lamp blacks, acetylene blacks and channel blacks.

Examples of the extender pigment include silica, calcium carbonate and talc.

The hydrophobic dyes are not particularly limited, and any hydrophobic dyes may be used as long as they are capable of being emulsified by the water-soluble polymer (x') or being included in the water-soluble polymer (x'). To allow the dye to efficiently become included in the polymer, the solubility of the hydrophobic dye in the organic solvent used upon the production of the polymer (such as preferably methyl ethyl ketone) is preferably 2 g/L or more, and more preferably from 20 to 500 g/L as measured at 25° C.

Examples of the hydrophobic dyes include oil-soluble dyes and disperse dyes. Among these dyes, preferred are oil-soluble dyes. Examples of the oil-soluble dyes include one or more dyes selected from the group consisting of C.I. Solvent Black, C.I. Solvent Yellow, C.I. Solvent Red, C.I. Solvent Violet, C.I. Solvent Blue, C.I. Solvent Green, and C.I. Solvent Orange, etc., with various product numbers. These dyes are commercially available from Orient Chemical Industries Co., Ltd., BASF SE, etc.

The above colorants may be used alone or in the form of a mixture containing any two or more thereof at an optional mixing ratio.

<Water-Soluble Polymer (x')>

The water-soluble polymer (x') used in the colorant dispersion serves for finely dispersing the colorant and enhancing a dispersion stability of the colorant.

The water-soluble polymer (x') used in the present invention means a polymer having a solubility of more than 10 g, preferably 20 g or more, and more preferably 30 g or more as measured by dissolving the polymer in 100 g of water at 25° C. When the water-soluble polymer (x') contains any salt-forming group, the solubility thereof means the value measured by neutralizing 100% of the salt-forming group of the water-soluble polymer (x') with acetic acid or sodium hydroxide according to the kind of salt-forming group to be neutralized. The degree of neutralization of the salt-forming group may be determined by the below-mentioned method.

Examples of the water-soluble polymer (x') include water-soluble vinyl polymers, water-soluble ester polymers and water-soluble urethane polymers. Among these polymers, preferred are water-soluble vinyl polymers. The water-soluble vinyl polymer is preferably produced by copolymerizing a monomer mixture containing a salt-forming group-containing monomer as a component (a') and a monomer represented by the following formula (1) as a component (b').

$$CH_2=C(R^1)-R^2 \quad (1)$$

wherein $R^1$ is a hydrogen atom or an alkyl group having 1 to 5 carbon atoms; and $R^2$ is an aromatic ring-containing hydrocarbon group having 6 to 22 carbon atoms.

The water-soluble vinyl polymer contains a constitutional unit derived from the component (a') and a constitutional unit derived from the component (b').

The salt-forming group-containing monomer as the component (a') is preferably in the form of an anionic monomer.

Examples of the anionic monomer include one or more monomers selected from the group consisting of unsaturated carboxylic acid monomers, unsaturated sulfonic acid monomers and unsaturated phosphoric acid monomers.

Specific examples of the unsaturated carboxylic acid monomers include acrylic acid, methacrylic acid, crotonic acid, itaconic acid, maleic acid, fumaric acid, citraconic acid and 2-methacryloyloxymethylsuccinic acid.

Specific examples of the unsaturated sulfonic acid monomers include styrenesulfonic acid, 2-acrylamido-2-methylpropanesulfonic acid, 3-sulfopropyl (meth)acrylate and bis(3-sulfopropyl) itaconate.

Specific examples of the unsaturated phosphoric acid monomers include vinylphosphonic acid, vinyl phosphate, bis(methacryloxyethyl) phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a low viscosity and a good ejecting property, etc., of the resulting ink, preferred are the unsaturated carboxylic acid monomers, and more preferred are acrylic acid and methacrylic acid.

As the monomer represented by the formula (1) as the component (b'), there are preferably used those monomers of the formula (1) in which $R^1$ is a hydrogen atom or a methyl group, more specifically, one or more monomers selected from the group consisting of styrene, vinyl naphthalene, α-methyl styrene, vinyl toluene, ethylvinyl benzene, 4-vinyl biphenyl and 1,1-diphenyl ethylene from the viewpoints of a high optical density, etc., of the resulting ink. Among these monomers, from the viewpoints of a high optical density, a good storage stability, etc., of the resulting ink, more preferred are one or more styrene-based monomers selected from the group consisting of styrene, α-methyl styrene and vinyl toluene.

The water-soluble vinyl polymer preferably contains the component (a') in an amount of from 5 to 80% by weight and more preferably from 10 to 70% by weight, and the component (b') in an amount of from 15 to 85% by weight and more preferably from 25 to 75% by weight.

The water-soluble polymer (x') preferably has a weight-average molecular weight of from 1,000 to 30,000 and more preferably from 2,000 to 20,000, and an acid value of from 100 to 300 mg KOH/g and more preferably from 150 to 250 mg KOH/g, from the viewpoint of a good dispersibility. Meanwhile, the weight-average molecular weight of the water-soluble polymer (x') may be measured by the method described in Examples below.

Examples of commercially available products of the water-soluble polymer (x') include "JONCRYL (registered trademark) 57J", "JONCRYL 60J", "JONCRYL 61J", "JONCRYL 63J", "JONCRYL 70J", "JONCRYL PD-96J" and "JONCRYL 501J" all available from BASF Japan, Ltd. These commercially available polymer products are in the form of a neutralized product, and if required, an additional neutralizing agent may be separately added thereto.

<Production of Colorant Dispersion>

The method for production of the colorant dispersion is not particularly limited. However, the colorant dispersion is preferably produced by the following method. That is, the water-soluble polymer (x') is first dissolved in water, and then, if required, after adding a neutralizing agent, an organic solvent, a surfactant, etc., the obtained solution is mixed with the colorant such as a pigment, and thereafter the resulting mixture is subjected to preliminary mixing and dispersing treatment.

The dispersing medium used for production of the colorant dispersion may be either water or an aqueous medium. From the viewpoints of enhancing a dispersibility of the colorant and well controlling a viscosity of the dispersion, etc., an organic solvent which is dissolvable or miscible in water may be appropriately added to the dispersing medium. Examples of the organic solvent include alcohol solvents and ketone solvents. Specific examples of the organic solvent include methanol, ethanol, 1-butanol, 2-butanol, acetone and methyl ethyl ketone.

These organic solvents may be used alone or in the form of a mixture of any two or more thereof. In addition, in order to further enhance a dispersibility of the colorant dispersion, a surfactant, etc., may be added in an appropriate amount to the organic solvent.

In order to control the average particle size of the particles in the colorant dispersion as desired, the colorant dispersion is preferably successively subjected to substantial dispersing treatment. The average particle size of the particles in the colorant dispersion is not particularly limited, and is preferably 150 nm or less, more preferably 100 nm or less and still more preferably 80 nm or less as an average particle size of the colorant particles upon being dispersed from the viewpoints of a good color developability and a high optical density of the resulting ink.

The preliminary mixing and dispersing treatment may be carried out using a stirring device or a dispersing device. Examples of the stirring device or the dispersing device include ordinary stirring devices such as paddle blades, turbine blades and anchor blades, and high-speed stirring type dispersing devices such as "Ultra Disper" (tradename: available from Asada Iron Works Co., Ltd.), "Ebara Milder" (tradename: available from Ebara Corporation), and "TK Homomixer" (tradename: available from Primix Corporation).

As the dispersing device for the substantial dispersing treatment, there may be used, for example, roll mills, media mills, kneaders, extruders, ultrasonic homogenizers and high-pressure homogenizers. Among these dispersing devices, preferred are high-pressure homogenizers and media mills which have a high capability of finely dividing the colorant particles, and more preferred are media mills (media dispersing devices) in which microfine media can be suitably used, such as "Ultra Apex Mill" (tradename: available from Kotobuki Industries Co., Ltd.), "Pico Mill" (tradename: available from Asada Iron Works Co., Ltd.) and "Star Mill" (tradename: available from Ashizawa Finetech Ltd.).

Examples of the material of the media particles used in the media dispersing devices include high-hardness metals such as stainless steel and chromium alloys, high-hardness ceramic materials such as alumina, zirconia, zircon and titania, glass materials, and polymeric materials such as ultra-high molecular weight polyethylenes and nylons.

Among these media particles, preferred are ceramic media particles having a relatively large specific gravity from the viewpoints of a high shear force or impact force for finely dividing the particles in the colorant dispersion, a large pulverization force and facilitated separation between the colorant dispersion and the media particles, and more preferred are zirconia, titania, etc., from the viewpoint of a good abrasion resistance.

The media particles used in the above media dispersing devices may have a desired particle size (diameter). The particle size of the media particles is preferably from 0.01 to 0.25 mm and more preferably from 0.03 to 0.20 mm from the viewpoints of finely dividing the colorant particles, shortening the dispersing time and facilitating separation of the colorant dispersion from the media particles.

The peripheral speed of a tip end of an agitator disk (rotor) of the media dispersing devices is not particularly limited, and is preferably 4 m/s or more, and more preferably 6 m/s or more. When the peripheral speed is 4 m/s or more, it is possible to maintain a good mixing and dispersing condition in a dispersing chamber, and obtain a centrifugal force required for separating the dispersed product from the media particles.

An apparent filling rate of the media particles in the dispersing chamber of the media dispersing device is preferably from 50 to 100% by volume on the basis of the volume of a space in the dispersing chamber. When the apparent filling rate of the media particles is 50% by volume or less, the media particles tend to have poor pulverizing, shearing and impinging effects, so that the effect of dispersing and finely dividing the colorant tends to be deteriorated.

The procedure for dispersing the colorant in the colorant dispersion may be carried out by adequately selecting and setting a circulation-type or continuous-type media dispersing device, media particles, a particle size of the media particles, a peripheral speed of a rotor, a filling rate of the media particles, etc., as described above. The energy required for the dispersing procedure is preferably determined such that a net cumulative power per 1 kg of the colorant dispersion is in the range of from 0.01 to 2.0 [kwh/kg] from the viewpoints of attaining a desired dispersing degree and preventing excessive dispersing condition of the colorant dispersion. The "net cumulative power" used herein means the value obtained by multiplying a net power [kw] by a treating time [h]. The "net power" used herein means a power obtained by subtracting an idle running power from an actual loading power applied to the dispersing device. The "idle running power" used herein means a power required for operating the dispersing device under the condition that neither media particles nor dispersing medium are used therein. As an alternative method for determining the net cumulative power, there may also be used the method in which a sum of a heat amount applied to the colorant dispersion and a heat amount removed by a cooling water is obtained as the dispersing energy.

The dispersing energy is applied to a dispersion when the dispersion is flowed and passed through the media dispersing device. However, the flow rate of the dispersion to be treated in the dispersing device must be controlled to an appropriate range from the viewpoints of preventing variation in particle size or viscosity of the colorant dispersion owing to generation of heat and preventing occurrence of clogging or leakage of the media particles. The flow rate of the dispersion to be treated may vary depending upon a capacity and a size of the dispersing device used, and is preferably controlled such that the average retention time in the dispersing chamber per one pass lies within the range of from 30 s to 10 min. The total average retention time obtained by multiplying the average retention time per one pass by the number (frequency) of passes is preferably from 2 min to 100 min. The "average retention time" used herein means the value obtained by dividing a space volume [L] in the dispersing chamber except for that of the media particles by the flow rate [L/h] of the dispersion to be treated.

The colorant dispersion preferably has a non-volatile content of from 5 to 50% by weight and more preferably from 8 to 40% by weight from the viewpoints of a good productivity and a good handling property. Meanwhile, the "non-volatile content" of the colorant dispersion as used herein means the value calculated according to the following calculation formula (1).

Non-Volatile Content(wt %)=[(Total Weight of Water-Soluble Polymer (x'),Colorant, and Neutralizing Agent and Surfactant as Optional Components)/(Weight of Colorant Dispersion)]×100  (1)

From the viewpoints of preventing occurrence of clogging or leakage of the media particles, the viscosity of the colorant dispersion when dispersed is preferably 100 mPa·s or less, more preferably 50 mPa·s or less and still more preferably 20 mPa·s or less. The viscosity of the colorant dispersion may be controlled by adjusting the non-volatile content, and further by adjusting a mass ratio of the organic solvent to water (organic solvent/water). In the latter method, the mass ratio of the organic solvent to water (organic solvent/water) is preferably adjusted to from 0 to 0.5.

The contents of the respective components in the colorant dispersion are controlled such that the content of the colorant therein is preferably from 5 to 50% by weight and more preferably from 7.5 to 40% by weight; the content (solid content) of the water-soluble polymer (x') therein is preferably from 0.1 to 10% by weight and more preferably from 0.2 to 5% by weight; the content of water therein is preferably from 10 to 90% by weight and more preferably from 20 to 85% by weight; and the content of the organic solvent therein is preferably from 0 to 50% by weight and more preferably from 5 to 30% by weight.

The amount of the water-soluble polymer (x') contained in the non-volatile component is preferably from 0.5 to 15% by weight and more preferably from 1 to 10% by weight.

The dispersing treatment in the media dispersing device may be generally carried out under a cooling condition. The temperature of the colorant dispersion to be treated is preferably 50° C. or lower and more preferably 40° C. or lower from the viewpoints of enhancing a thermal stability and preventing increase in viscosity and occurrence of coagulation.

According to the above method for producing the colorant dispersion, the colorant such as a pigment is finely divided and, as a result, formed into fine particles having a very large specific surface area, so that the obtained colorant dispersion can be enhanced in color developability and absorbency. For instance, when comparing a dispersion obtained by dispersing a yellow pigment as the colorant in the water-soluble polymer (x') with a dispersion obtained by dispersing the yellow pigment in the water-insoluble polymer (y'), it is ascertained that the average particle size of the colorant particles in the colorant dispersion using the water-soluble polymer (x') can be reduced by about 40 to 50 nm, and the absorbency thereof can also be enhanced by about 10 to 20% as measured at an absorption wavelength of 432 nm, as compared to those using the water-insoluble polymer (y').

However, when the colorant dispersion prepared by dispersing the colorant using the water-soluble polymer (x') solely is printed as such on a plain paper, there tends to occur undesirable penetration of the colorant dispersion into the paper, so that an amount of the colorant remaining on a surface of the paper tends to become small. As a result, the resulting printed images or characters tend to have a low optical density and therefore fail to satisfy requirements and performances as desired.

To solve the above problems, in the present invention, the previously prepared emulsion of the water-insoluble polymer (y') is added to the above colorant dispersion, and the resulting dispersion is subjected to dispersing treatment. As a result, the water-insoluble polymer (y') is allowed to adhere onto at least a part of a surface of the finely divided colorant particles, or the colorant particles in the colorant dispersion are allowed to adhere to each other, so that a clogging effect on a surface of the paper and a hydrophobic coagulation property of the particles can be enhanced. Thus, it is considered that the colorant can be prevented from penetrating into the paper, resulting in enhancement in optical density of the resulting colorant dispersion.

[Emulsion of Water-Insoluble Polymer]

The water-insoluble polymer emulsion is preferably an emulsion composition which contains the salt-forming group-containing water-insoluble polymer (y'), an organic solvent having a solubility in water at 20° C. of from 5 to 40% by weight, a neutralizing agent and water.

<Water-Insoluble Polymer (y')>

The water-insoluble polymer (y') is preferably in the form of a water-insoluble graft polymer from the viewpoint of enhancing an optical density, a dispersion stability, an ejection property, etc., of the resulting ink. More specifically, in the water-soluble graft polymer, a main chain thereof is a polymer chain containing at least a constitutional unit derived from the component (a') and a constitutional unit derived from the component (b'), and a side chain thereof is a polymer chain containing at least a constitutional unit derived from a hydrophobic monomer (as a component (d')).

In the present invention, since the main chain of the water-insoluble polymer (y') contains the constitutional unit derived from the component (a') and the constitutional unit derived from the component (b'), it is considered that the resulting ink can exhibit excellent dispersion stability and storage stability.

The "water-insoluble" polymer used herein means a polymer which has a solubility of 10 g or less, preferably 5 g or less and more preferably 1 g or less as measured by dissolving a neutralized product of the objective polymer in 100 g of water at 25° C. The "solubility" used herein means the value measured by neutralizing 100% of a salt-forming group of the water-insoluble polymer (y') with sodium hydroxide or acetic acid according to the kind of salt-forming group to be neutralized. The above water-insoluble polymer (y') can exhibit suitable adhesion and adsorption to the colorant.

The constitutional unit derived from the component (a') in the main chain of the water-insoluble polymer (y') is preferably obtained by polymerizing the salt-forming group-containing monomer. Alternatively, after producing a polymer containing no salt-forming group by polymerization, the salt-forming group (an anionic group, a cationic group, etc.) may be introduced into a polymer chain of the resulting polymer.

Specific examples of the suitable salt-forming group-containing monomer include the same monomers as described above. Among these monomers, preferred are acrylic acid and methacrylic acid.

Specific examples of the suitable monomer represented by the formula (1) as the component (b') include the same monomers as described above. Among these monomers, preferred are one or more monomers selected from the group consisting of styrene, α-methyl styrene and vinyl toluene.

The main chain of the water-insoluble polymer (y') may also contain a constitutional unit derived from a monomer represented by the following formula (2) as a component (c'-1), a constitutional unit derived from a (meth)acrylate monomer containing an alkyl group having 1 to 22 carbon atoms as a component (c'-2), or a constitutional unit derived from a nonionic (meth)acrylate-based monomer as a component (c'-3) from the viewpoint of enhancing a dispersion stability, a storage stability, an optical density, etc., of the resulting ink.

$$CH_2=CR^3COOR^4 \qquad (2)$$

wherein $R^3$ is a hydrogen atom or a methyl group; and $R^4$ is an arylalkyl group having 7 to 22 carbon atoms, preferably 7 to 18 carbon atoms and more preferably 7 to 12 carbon atoms, or an aryl group having 6 to 22 carbon atoms, preferably 6 to 18 carbon atoms and more preferably 6 to 12 carbon atoms.

Specific examples of the component (c'-1) include benzyl (meth)acrylate, phenyl (meth)acrylate, 2-phenylethyl (meth)acrylate, phenoxyethyl (meth)acrylate, 1-naphthalyl (meth)acrylate, 2-naphthalyl (meth)acrylate, phthalimidomethyl (meth)acrylate, p-nitrophenyl (meth)acrylate, 2-hydroxy-3-phenoxypropyl (meth)acrylate, 2-methacryloyloxyethyl-2-hydroxypropyl phthalate and 2-acryloyloxyethyl phthalate. Among these monomers, preferred is benzyl (meth)acrylate.

Specific examples of the component (c'-2) include methyl (meth)acrylate, ethyl (meth)acrylate, (iso)propyl (meth)acrylate, (iso- or tertiary-)butyl (meth)acrylate, 2-ethylhexyl (meth)acrylate, (iso)octyl (meth)acrylate, (iso)decyl (meth)acrylate, (iso)dodecyl (meth)acrylate, (iso)stearyl (meth)acrylate and behenyl (meth)acrylate.

Meanwhile, the terms "(iso- or tertiary-)" and "(iso)" as used herein mean both the case where the branched structure expressed by any of "iso" and "tertiary" is present, and the case where the branched structure is not present (i.e., normal).

The component (c'-3) is preferably a nonionic (meth)acrylate-based monomer represented by the following formula (3).

$$CH_2=C(R^5)COO(R^6O)_nR^7 \qquad (3)$$

wherein $R^5$ is a hydrogen atom or an alkyl group having 1 to 3 carbon atoms; $R^6$ is an alkylene group having 2 to 18 carbon atoms; n represents an average molar number of addition of $R^6O$ groups, and is a number of from 1 to 30; and $R^7$ is preferably a hydrogen atom, an alkyl group having 1 to 18 carbon atoms, or a phenyl group which may contain an alkyl group having 1 to 8 carbon atoms.

In the formula (3), from the viewpoint of a good polymerizability, etc., $R^5$ is preferably a hydrogen atom or a methyl group, and $R^6$ is preferably an alkylene group having 2 to 4 carbon atoms such as an ethylene group, a trimethylene group, a propan-1,2-diyl group or a tetramethylene group. Among these groups as $R^6$, from the viewpoint of allowing resulting prints to exhibit a high gloss, etc., preferred is an ethylene group, and from the viewpoint of a high optical density of the resulting ink, preferred are a trimethylene group, a propan-1,2-diyl group and a tetramethylene group. The suffix n is preferably a number of from 2 to 25 and more preferably from 4 to 23 from the viewpoints of a high optical density, a good storage stability, etc., of the resulting ink. At least two of the ($R^6O$) groups in the number of n may be the same or different, and when the at least two groups are different from each other, they may be either block-added or random-added.

$R^7$ is preferably an alkyl group having 1 to 12 carbon atoms and more preferably an alkyl group having 1 to 8 carbon atoms from the viewpoints of a high optical density, a good storage stability, etc., of the resulting ink, and also is preferably a phenyl group which may contain an alkyl group having 1 to 8 carbon atoms.

Examples of the alkyl group having 1 to 8 carbon atoms include a methyl group, an ethyl group, a propyl group, an isopropyl group, a butyl group, a tert-butyl group, a hexyl group, an octyl group and a 2-ethylhexyl group.

Specific examples of the nonionic monomer represented by the formula (3) include hydroxyethyl methacrylate, methoxypolyethylene glycol mono(meth)acrylate; polyethylene glycol mono(meth)acrylate; methoxypolypropylene glycol (meth)acrylate; polypropylene glycol mono(meth)acrylate; ethylene glycol-propylene glycol (meth)acrylate; poly(ethylene glycol-propylene glycol) mono(meth)acrylate; octoxypolyethylene glycol-polypropylene glycol mono(meth)acrylate; and phenoxypolyethylene glycol polypropylene glycol monomethacrylate. These nonionic monomers may be used alone or in combination of any two or more thereof.

Specific examples of commercially available products of the above monomers include polyfunctional acrylate monomers (NK Esters) available from Shin-Nakamura Chemical Co., Ltd., such as "M-40G", "M-90G" and "M-230G"; and BLEMMER Series available from NOF Corporation, such as "PE-90", "PE-200", "PE-350", "PME-100", "PME-200", "PME-400", "PME-1000", "PP-500", "PP-800", "PP-1000", "AP-150", "AP-400", "AP-550", "AP-800", "50PEP-300", "50POEP-800B" and "43PAPE-600B".

The weight ratio of the constitutional unit derived from the component (a') (calculated as an amount of non-neutralized component; hereinafter defined in the same way) to the constitutional unit derived from the component (b') [(content of constitutional unit derived from component (a'))/(content of constitutional unit derived from component (b'))] in the main chain of the water-insoluble polymer (y') is preferably from 1/1 to 1/10 and more preferably from 1/1.5 to 1/5 from the viewpoints of enhancing an optical density, a smear-fastness, etc., of the resulting ink.

The contents of the respective constitutional units derived from the components (a') to (c') in the main chain of the water-insoluble polymer (y') used in the present invention are as follows.

The content of the constitutional unit derived from the component (a') is preferably from 5 to 40% by weight, more preferably from 10 to 35% by weight and still more preferably from 15 to 30% by weight from the viewpoint of enhancing a dispersibility of the water-insoluble polymer (y'), etc.

The content of the constitutional unit derived from the component (b') is preferably from 10 to 80% by weight, more preferably from 15 to 75% by weight and still more preferably from 20 to 70% by weight from the viewpoint of enhancing an optical density, a smear-fastness, etc., of the resulting ink.

The content of the constitutional unit derived from the component (c'-1) is preferably from 0 to 30% by weight and more preferably from 0 to 15% by weight from the viewpoint of enhancing a dispersion stability, etc. The content of the constitutional unit derived from the component (c'-2) is preferably from 0 to 30% by weight and more preferably from 0 to 15% by weight from the viewpoint of enhancing an optical density, a highlighter-fastness, etc., of the resulting ink. The content of the constitutional unit derived from the component (c'-3) is preferably from 0 to 40% by weight and more preferably from 0 to 30% by weight from the viewpoint of enhancing a dispersion stability, an optical density, etc., of the resulting ink.

The water-insoluble polymer (y') used in the present invention contains a constitutional unit derived from a hydrophobic monomer as a component (d') on a side chain thereof from the viewpoints of allowing the water-insoluble polymer (y') to adhere to the colorant and enhancing an optical density of the resulting ink.

The content of the constitutional unit derived from the component (&) in the side chain of the water-insoluble polymer (y') is preferably 60% by weight or more, more preferably 70% by weight or more, and still more preferably 90% by weight or more from the viewpoint of allowing the water-insoluble polymer (y') to be adsorbed onto the colorant and enhancing an optical density of the resulting ink.

The hydrophobic monomer as the component (d') is preferably a styrene-based macromer. The side chain containing the constitutional unit derived from the styrene-based macromer may be obtained by copolymerizing the styrene-based macromer having a polymerizable functional group at one terminal end thereof.

Examples of the styrene-based macromer include styrene homopolymers having a polymerizable functional group at one terminal end thereof, and copolymers of styrene with the other monomer which have a polymerizable functional group at one terminal end thereof. Examples of the preferred polymerizable functional group bonded to one terminal end of the macromer or the polymer include an acryloyloxy group and a methacryloyloxy group. Examples of the other monomer to be copolymerized with styrene include (meth)acrylates, aromatic group-containing (meth)acrylates and acrylonitrile.

The number-average molecular weight of the styrene-based macromer is from 1,000 to 10,000 and preferably from 2,000 to 8,000 from the viewpoint of reducing the viscosity while increasing the copolymerization ratio in order to enhance a storage stability of the resulting ink.

The number-average molecular weight of the styrene-based macromer may be measured by gel permeation chromatography using tetrahydrofuran containing 50 mmol/L of acetic acid as a solvent and using polystyrene as a standard substance.

Specific examples of commercially available products of the styrene-based macromer include "AS-6", "AS-6S", "AN-6", "AN-6S", "HS-6" and "HS-6S" (tradenames all available from Toagosei Co., Ltd.), etc.

In the water-insoluble polymer (y') used in the present invention, the weight ratio of the main chain containing the constitutional unit derived from the component (a') and the constitutional unit derived from the component (b') to the side chain containing the constitutional unit derived from the component (d') [main chain/side chain] is preferably 1/1 to 20/1, more preferably from 3/2 to 15/1 and still more preferably from 2/1 to 10/1 in order to enhance an optical density, a gloss, a smear-fastness, etc., of the resulting ink (the calculation is made by regarding the polymerizable functional group as being included in the side chain; hereinafter defined in the same way).

The water-insoluble polymer (y') used in the present invention may be produced by copolymerizing a monomer mixture containing the component (a'), the component (b') and the component (d'), and is preferably produced by copolymerizing a monomer mixture further containing the component (c') in addition to the above components (these monomer mixtures are hereinafter generally referred to as a "monomer mixture").

The contents of the above components (a') to (d') in the monomer mixture or the contents of the constitutional units derived from the components (a') to (d') in the main chain or side chain of the water-insoluble polymer (y') are as follows.

The content of the component (a') in the monomer mixture (content of non-neutralized component; hereinafter defined in the same way) or the content of the constitutional unit derived from the component (a') in the main chain of the water-insoluble polymer (y') is preferably from 3 to 30% by weight, more preferably from 5 to 27% by weight and still more preferably from 10 to 25% by weight from the viewpoint of enhancing a dispersion stability of the resultant dispersion, a gloss of prints, etc.

The content of the component (b') in the monomer mixture or the content of the constitutional unit derived from the component (b') in the main chain of the water-insoluble polymer (y') is preferably from 10 to 80% by weight, more preferably from 15 to 70% by weight and still more preferably from 20 to 60% by weight from the viewpoint of enhancing an optical density and a smear-fastness of prints, etc.

The content of the component (c') in the monomer mixture or the content of the constitutional unit derived from the component (c') in the water-insoluble polymer (y') is preferably from 0 to 40% by weight and more preferably from 0 to 30% by weight from the viewpoint of a high optical density, a good dispersion stability, a highlighter-fastness, etc., of the resulting ink.

The content of the component (d') in the monomer mixture or the content of the constitutional unit derived from the component (d') in the side chain of the water-insoluble polymer (y') is preferably from 5 to 50% by weight, more preferably from 5 to 40% by weight and still more preferably from 5 to 35% by weight from the viewpoint of enhancing an optical density of prints, etc.

The content ratio by weight of the component (a') to the components (d') [(content of component (a')/content of component (d'))] in the monomer mixture, or the content ratio by weight of the constitutional unit derived from the component (a') to the constitutional unit derived from the components (d') [(content of constitutional unit derived from component (a')/content of constitutional unit derived from component (d'))] in the water-insoluble polymer (y') is preferably from 1/2 to 3/1 and more preferably from 1/1 to 2.5/1 from the viewpoints of a good dispersion stability, a high optical density, etc., of the resulting ink.

In the water-insoluble polymer (y') used in the present invention, the salt-forming group derived from the salt-forming group-containing monomer is preferably neutralized with the following neutralizing agent. As the neutralizing agent, acids or bases may be used according to the kind of salt-forming group to be neutralized in the water-insoluble polymer (y'). Examples of the neutralizing agent include acids such as hydrochloric acid, acetic acid, propionic acid, phosphoric acid, sulfuric acid, lactic acid, succinic acid, glycolic acid, gluconic acid and glyceric acid, and bases such as lithium hydroxide, sodium hydroxide, potassium hydroxide, ammonia, methylamine, dimethylamine, trimethylamine, ethylamine, diethylamine, triethylamine and triethanolamine.

The degree of neutralization of the salt-forming group is preferably from 10 to 200%, more preferably from 20 to 150% and still more preferably from 30 to 100%. Also, when the salt-forming group of the polymer is excessively neutralized upon a preliminary emulsification step, the degree of neutralization thereof may be controlled by using the neutralizing agent which is capable of being removed by a concentration step.

The degree of neutralization of the anionic salt-forming group is determined according to the following calculation formula (2):

$$\{[\text{weight(g) of neutralizing agent/equivalent of neutralizing agent}]/[\text{acid value of polymer(mg KOH/g)} \times \text{weight(g) of polymer}/(56 \times 1000)]\} \times 100 \quad (2)$$

The degree of neutralization of the cationic salt-forming group is determined according to the following calculation formula (3):

$$\{[\text{weight(g) of neutralizing agent/equivalent of neutralizing agent}]/[\text{amine value of polymer(mg HCl/g)} \times \text{weight(g) of polymer}/(36.5 \times 1000)]\} \times 100 \quad (3)$$

The acid value or amine value may be calculated from the respective constitutional units of the water-insoluble polymer (y'), or may also be determined by the method of subjecting a solution prepared by dissolving the polymer in an appropriate solvent (such as, for example, methyl ethyl ketone) to titration.

The acid value of the water-insoluble polymer is preferably 30 (mg KOH/g) or more, and more preferably 40 (mg KOH/g) or more from the viewpoint of a good dispersion stability. Also, from the viewpoint of allowing the resulting ink to exhibit a high optical density, the acid value of the water-insoluble polymer is preferably 200 (mg KOH/g) or less, and more preferably 150 (mg KOH/g) or less. From these viewpoints, the acid value of the water-insoluble polymer is preferably 30 to 200 (mg KOH/g) and more preferably 40 to 150 (mg KOH/g).

<Production of Water-Insoluble Polymer (y')>

The water-insoluble polymer (y') used in the present invention may be produced by copolymerizing the monomer mixture by known polymerization methods such as bulk polymerization, solution polymerization, suspension polymerization and emulsion polymerization. Among these polymerization methods, preferred is the solution polymerization.

The solvent used in the solution polymerization method is preferably an polar organic solvent. The polar organic solvent miscible with water may be used in the form of a mixture with water.

Examples of the polar organic solvents include aliphatic alcohols having from 1 to 3 carbon atoms such as methanol, ethanol and propanol; ketones such as acetone, methyl ethyl ketone and methyl isobutyl ketone; and esters such as ethyl acetate. Among these solvents, preferred are methanol, ethanol, acetone, methyl ethyl ketone and mixed solvents of at least one thereof with water.

The polymerization conditions of the monomer mixture may vary depending upon the kinds of radical polymerization initiator, monomers, solvent, etc., to be used, and therefore are not particularly limited. The polymerization is generally conducted at a temperature of preferably from 30 to 100° C. and more preferably from 50 to 80° C., and the polymerization time is preferably from 1 to 20 h. Further, the polymerization is preferably conducted in a nitrogen atmosphere or in an atmosphere of an inert gas such as argon.

After completion of the polymerization reaction, the water-insoluble polymer (y') thus produced may be isolated from the reaction solution by a known method such as reprecipitation and removal of the solvent by distillation. The thus obtained water-insoluble polymer (y') may be purified by repeated reprecipitation, membrane separation, chromatography, extraction, etc., for removing unreacted monomers, etc., therefrom.

The weight-average molecular weight of the water-insoluble polymer (y') thus produced is preferably from 90,000 to 400,000 and more preferably from 120,000 to 350,000 from the viewpoints of a good dispersion stability of the colorant therein, good water resistance and ejection property of the resulting ink, etc.

Meanwhile, the weight-average molecular weight of the water-insoluble polymer (y') may be measured by the method as described in Examples below.

<Organic Solvent>

The organic solvent used in the water-insoluble polymer emulsion is used for dissolving (a part of) the water-insoluble polymer (y') therein to an adequate extent. The organic solvent used above preferably have a solubility in water at 20° C. of from 5 to 40% by weight (from 5 to 40 g in 100 g of water) and preferably from 5 to 30% by weight. Examples of the organic solvents include alcohol solvents, ketone solvents, ether solvents, aromatic hydrocarbon solvents, aliphatic hydrocarbon solvents and halogenated hydrocarbon solvents.

Examples of the alcohol solvents include 1-butanol and 2-butanol. Examples of the ketone solvents include methyl ethyl ketone, methyl isobutyl ketone and acetone. Examples of the aromatic hydrocarbon solvents include benzene, toluene and xylene. Examples of the aliphatic hydrocarbon solvents include pentane, hexane and heptane. Examples of the halogenated hydrocarbon solvents include chloroform, carbon dichloride, carbon tetrachloride and ethylene chloride. Among these organic solvents, preferred are ketone solvents, and especially preferred are methyl ethyl ketone and methyl isobutyl ketone, from the viewpoints of a high safety thereof and a good handling property upon removal of the solvents in post treatments.

These organic solvents may be used alone or in the form of a mixture of any two or more thereof.

<Preparation of Water-Insoluble Polymer Emulsion>

The water-insoluble polymer emulsion may be prepared by the method of first dissolving the water-insoluble polymer (y') in an organic solvent, successively adding a neutralizing agent and water, if required, together with a surfactant, etc., to the obtained solution, and then stirring and mixing the resulting mixture until forming an oil-in-water type emulsified product (emulsion) containing emulsified particles having a desired average particle size. When the polymer is hardly emulsified, a mechanical force may be applied to the mixture, if required, using a high-speed stirrer, a dispersing device, etc. The average particle size of the emulsified particles in the emulsion is preferably adjusted to the range of from 0.01 to 2 μm.

As the emulsifying method, there may be used a reverse phase method and a normal phase method. More specifically, there may be used the method in which a mixed solution of water and a neutralizing agent is first prepared, and then a mixed solution of the water-insoluble polymer (y') and the organic solvent is dropped to the first prepared mixed solution, or the method in which a mixture of the water-insoluble polymer (y'), the organic solvent and the neutralizing agent is dropped into water, or the like. The temperature used upon the emulsification is preferably 40° C. or lower and more preferably 30° C. or lower from the viewpoints of controlling a particle size of the emulsified particles and attaining a stable viscosity of the emulsion.

The ratios between the respective components in the emulsion may be controlled such that the content of the organic solvent therein is preferably from 5 to 40% by weight and more preferably from 10 to 30% by weight; the content of the water-insoluble polymer (y') therein (in terms of a solid content) is preferably from 2 to 40% by weight and more preferably from 3 to 30% by weight; and the content of water therein is preferably from 50 to 90% by weight and more preferably from 55 to 85% by weight.

The neutralizing agent may be added in a well-controlled amount such that the finally obtained water dispersion exhibits a neutral liquid property, for example, a pH of 4.5 to 10. When the salt-forming group of the water-insoluble polymer (y') is an anionic group, the pH value of the finally obtained water dispersion is preferably adjusted, for example, to the range of 7 to 10.

[Process for Producing Water Dispersion for Ink-Jet Printing]

Step (I)

In the step (I), the colorant dispersion and the water-insoluble polymer emulsion are mixed with each other.

The method of mixing the colorant dispersion and the water-insoluble polymer emulsion is not particularly limited, and any mixing method may be used as long as they are mixed uniformly. The colorant dispersion and the water-insoluble polymer emulsion may be mixed, for example, using ordinary stirring blades such as paddle blades, turbine blades and anchor blades.

The order of charging of the colorant dispersion and the water-insoluble polymer emulsion is not particularly limited. The water-insoluble polymer emulsion may be added to the colorant dispersion, or the colorant dispersion may be added to the water-insoluble polymer emulsion.

The proportions of the respective components in the resulting mixture are controlled such that the colorant dispersion is present in an amount of preferably from 70 to 95% by weight and more preferably from 75 to 90% by weight, and the water-insoluble polymer emulsion is present in an amount of preferably 5 to 30% by weight and more preferably from 10 to 25% by weight.

Step (II)

In the step (II), the mixture obtained in the step (I) is subjected to dispersing treatment to obtain a dispersion of the colorant onto which the water-soluble polymer (x') is already adsorbed and the water-insoluble polymer (y') is further deposited.

In the step (II), the method of dispersing the mixture may be carried out, for example, using high-speed stirring type dispersing devices, roll mills, media mills, kneaders, extruders, ultrasonic homogenizers, high-pressure homogenizers, etc. Among these dispersing devices, preferred are high-pressure homogenizers capable of applying a very strong impact force or shearing force from the viewpoint of depositing the water-insoluble polymer (y') onto the colorant particles in the colorant dispersion and simultaneously suppressing formation of aggregates of the colorant particles in the colorant dispersion. Examples of the suitable high-pressure homogenizers include chamber-type high-pressure homogenizers such as "Microfluidizer" (tradename: available from Microfluidics Inc.) and "Ultimizer" (tradename: available from Sugino Machine Ltd.).

The pressure applied upon the treatment using the high-pressure homogenizers is preferably 100 MPa or more, and more preferably 150 MPa or more. From the same viewpoints, the number (frequency) of passes of the dispersion to be treated through the high-pressure homogenizers is one or more passes, preferably 3 or more passes and more preferably 5 or more passes.

The temperature of the dispersion after the treatment is increased by 20 to 50° C. as compared to that before the treatment. Therefore, the temperature of the dispersion before the treatment is preferably at least 20° C. or less, and the temperature of the dispersion after the treatment is preferably adjusted to 20° C. or less by cooling the dispersion immediately after the treatment. More specifically, a spiral type heat exchanger or a plate-type heat exchanger having a heat transfer surface area as required is mounted to an outlet of the high-pressure dispersing device to remove a heat therefrom.

The high-pressure dispersing device may be operated in the following manner. That is, from the viewpoint of preventing occurrence of broad distribution of the number of passes similarly to the media dispersing device and allowing a whole amount of the dispersion to pass through an inside of a high-pressure dispersing chamber thereof with a desired frequency, the high-pressure dispersing device is provided with two tanks, and operated, for example, by a so-called "catch-ball" method in which the dispersion is transferred between the two tanks or by a repeating method in which the dispersion subjected to one pass is returned to the previous tank and the similar passing operation is repeated.

The proportions of the respective components in the mixture are controlled such that the content of the colorant therein is preferably from 5 to 30% by weight and more preferably from 7.5 to 25% by weight; the content of the organic solvent derived from the water-insoluble polymer emulsion therein is preferably from 1 to 10% by weight and more preferably from 2 to 8% by weight; the content of water therein is preferably from 20 to 90% by weight and more preferably from 30 to 80% by weight; the total content (total solid content) of the water-soluble polymer (x') and the water-insoluble polymer (y') therein is preferably from 0.5 to 20% by weight and more preferably from 1.0 to 10% by weight.

The weight ratio of the water-soluble polymer (x') to the water-insoluble polymer (y') [water-soluble polymer (x')/water-insoluble polymer (y')] in the mixture is preferably from 1/5 to 2/1 and more preferably from 1/4 to 1/1 from the viewpoint of a high optical density and a good storage stability of the resulting water-based ink. When the weight ratio is 2/1 or less, the colorant can be prevented from penetrating into the paper, so that the resulting ink can exhibit a high optical density. When the weight ratio is 1/5 or more, the colorant can be readily dispersed and finely divided in the color dispersion. In addition, the weight ratio of the water-soluble polymer (x') to the water-insoluble polymer (y') [water-soluble polymer (x')/water-insoluble polymer (y')] in the mixture is preferably from 1/5 to 1/2, more preferably from 1/5 to 1/2.5, still more preferably from 1/5 to 1/3 and further still more preferably from 1/4 to 1/3 from the viewpoint of reducing a viscosity of the resulting water-based ink and enhancing an ejection property and an optical density thereof.

The "non-volatile content" of the mixture is preferably from 3 to 40% by weight and more preferably from 5 to 30% by weight from the viewpoints of a good productivity and a good handling property.

Meanwhile, the "non-volatile content" of the mixture used herein means the value calculated according to the following calculation formula (4).

$$\text{Non-Volatile Content(wt \%)} = [(\text{Total Weight of Solid Components in Color Dispersion and Solid Components in Water-Insoluble Polymer Emulsion})/(\text{Total Weight of Color Dispersion and Water-Insoluble Polymer Emulsion})] \times 100 \quad (4)$$

The particle size of particles dispersed in the mixture is controlled by the dispersing treatment such that the average particle size thereof is preferably from 30 to 300 nm and more preferably from 50 to 200 nm, from the viewpoints of a good dispersion stability of the resulting water dispersion and ink as well as a high optical density thereof on a plain paper. Meanwhile, the average particle size may be measured by the method described in Examples below.

When the water-insoluble polymer (y') is hardly deposited on the colorant particles in the color dispersion during the dispersing treatment or it is intended to enhance a dispersion stability of the colorant dispersion, the composition or solid content of the color dispersion may be varied in a stepwise manner. More specifically, there may be used the method in which the composition having a high solvent content is initially dispersed, and then water is added to the resulting dispersion to reduce a ratio of the organic solvent to water (organic solvent/water) therein, the method in which the composition having a high solid content is initially dispersed, and then water is added to the resulting dispersion to reduce the solid content, or the like.

Step (III)

In the step (III), the organic solvent is removed from the dispersion obtained in the step (II).

By conducting the step (III), it is possible to obtain a water dispersion in which the water-soluble polymer (x') and the water-insoluble polymer (y') are deposited on at least a part of the surface of the colorant. The removal of the organic solvent from the dispersion may be carried out by an ordinary method such as distillation under reduced pressure.

The organic solvent may be substantially completely removed from the thus obtained water dispersion, and the content of the residual organic solvent in the resulting water dispersion is preferably 0.1% by weight or less and more preferably 0.01% by weight or less. The contents of the water-soluble polymer (x') and the water-insoluble polymer (y') in the water dispersion are preferably respectively in the range of from 1 to 10% by weight and from 5 to 30% by weight on the basis of 100% by weight of the colorant, from the viewpoints of a good stability and a high optical density of the water dispersion. In addition, from the same viewpoints, the content of the colorant in the water dispersion is preferably from 10 to 50% by weight and more preferably from 15 to 40% by weight.

The water dispersion obtained by the process including the steps (I) to (III) is in the form of a water dispersion in which the colorant particles on which the water-soluble polymer (x') and the water-insoluble polymer (y') are deposited are dispersed in a dispersing medium containing water as a main medium. The water dispersion contains the colorant in the form of finely divided particles having a large specific surface area, and the water-insoluble polymer (y') is deposited on the colorant. Therefore, it is considered that the ink containing the water dispersion is hardly penetrated into a paper after printed with the ink, and remain on a surface of the paper, which results in enhancement of an optical density thereof.

The configuration of the particles in the water dispersion is not particularly limited, and any particle configuration may be used as long as the particles are formed from at least the colorant, the water-soluble polymer (x') and the water-insoluble polymer (y'). Examples of the configuration of the particles in the water dispersion include the particle configuration in which the colorant on which the water-soluble polymer (x') is deposited is enclosed in the water-insoluble polymer (y'), the particle configuration in which the colorant on which the water-soluble polymer (x') is deposited is uniformly dispersed with the water-insoluble polymer (y'), and the particle configuration in which the colorant on which the water-soluble polymer (x') is deposited is adsorbed onto a surface of the respective particles of the water-insoluble polymer (y').

In the water dispersion obtained by the process of the present invention, the adsorption rate (%) of the polymers onto the colorant is preferably from 50 to 100%, more preferably from 60 to 98% and still more preferably from 70 to 95% from the above viewpoints. The adsorption rate of the polymers may be measured by the method described in Examples below.

After completion of the steps (I) to (III), the resulting water dispersion may be subjected to centrifugal separation or filtration to remove coarse particles therefrom and thereby enhance a dispersion stability or an ejection stability of the resulting ink.

The water dispersion obtained according to the present invention may be used directly as a water-based ink. However, since it is important that the ink has, in particular, a good dispersion stability and a good ejection stability upon continuous printing when applied to high-speed printers, it is preferred that the particles of the water-soluble polymer (x') and/or the water-insoluble polymer (y') be subjected to crosslinking treatment using a crosslinking agent to enhance these stabilities.

<Crosslinking Agent>

The crosslinking agent is preferably selected from those compounds containing at least two reactive functional groups in a molecule thereof in order to adequately crosslink the polymers. The number of the reactive functional groups contained in the crosslinking agent is preferably from 2 to 6 from the viewpoint of well controlling a molecular weight of the resulting crosslinked polymer to enhance a storage stability thereof. The reactive functional groups are preferably one or more groups selected from the group consisting of a hydroxyl group, an epoxy group, an aldehyde group, an amino group, a carboxyl group, an oxazoline group and an isocyanate group.

The crosslinking agent used in the present invention preferably has a solubility in water of 50 g or less, more preferably 40 g or less and still more preferably 30 g or less as measured by dissolving the crosslinking agent in 100 g of water at 25° C. from the viewpoint of subjecting the surface of the polymers, in particular, the water-insoluble polymer (y'), to crosslinking reaction in an efficient manner. The molecular weight of the crosslinking agent is preferably from 120 to 2000, more preferably from 150 to 1500 and still more preferably from 150 to 1000 from the viewpoint of a facilitated reaction with the polymers and a good storage stability of the resulting water dispersion.

Examples of the suitable crosslinking agent include the following compounds (a) to (c):

(a) Compounds containing two or more epoxy groups in a molecule thereof:

Examples of the compounds containing two or more epoxy groups include polyglycidyl ethers such as ethylene glycol diglycidyl ether, polyethylene glycol diglycidyl ether, polypropylene glycol diglycidyl ether, glycerol triglycidyl ether, glycerol polyglycidyl ether, polyglycerol polyglycidyl ether, trimethylolpropane polyglycidyl ether, sorbitol polyglycidyl ether, pentaerythritol polyglycidyl ether, resorcinol diglycidyl ether, neopentyl glycol diglycidyl ether and hydrogenated bisphenol A-type diglycidyl ether.

(b) Compounds containing two or more oxazoline groups in a molecule thereof:

Examples of the compounds containing two or more oxazoline groups include bisoxazoline compounds such as 2,2'-bis(2-oxazoline), 1,3-phenylene-bisoxazoline and 1,3-benzobisoxazoline, and compounds containing an end oxazoline group obtained by reacting the bisoxazoline compound with a polybasic carboxylic acid.

(c) Compounds containing two or more isocyanate groups in a molecule thereof:

Examples of the compounds containing two or more isocyanate groups include organic polyisocyanates and isocyanate-terminated prepolymers.

Among these crosslinking agents, preferred are the compounds (a) containing two or more epoxy groups in a molecule thereof, and more preferred are ethylene glycol diglycidyl ether and trimethylolpropane polyglycidyl ether.

The amount of the crosslinking agent used above is adjusted such that the weight ratio of the crosslinking agent to the polymers [crosslinking agent/polymers] is preferably from 0.3/100 to 50/100, more preferably from 1/100 to 40/100, still more preferably from 2/100 to 30/100 and especially preferably from 5/100 to 25/100 from the viewpoint of a good storage stability of the resulting water dispersion.

Also, the crosslinking agent is used in such an amount which is capable of reacting with preferably from 0.1 to 20 mmol/g, more preferably from 0.5 to 15 mmol/g and still more preferably from 1 to 10 mmol/g of an anionic group contained in the polymers in terms of an amount of the anionic group per 1 g of the polymers.

The crosslinked polymer in the resulting water dispersion preferably contain the base-neutralized salt-forming group (especially preferably a carboxyl group) in an amount of 0.5 mmol/g or more per 1 g of the crosslinked polymer. It is considered that such a crosslinked polymer is dissociated in the water dispersion and contributes to stabilization of the colorant-containing anionic crosslinked polymer particles owing to charge repulsion between the anions.

The crosslinking rate (mol %) of the crosslinked polymer as determined from the following calculation formula (5) is preferably from 10 to 80 mol %, more preferably from 20 to 70 mol % and still more preferably from 30 to 60 mol %. The crosslinking rate is the value calculated from the amount of the crosslinking agent used and the number of moles of the reactive group thereof as well as the amount of the polymers used and the number of moles of the reactive group thereof capable of reacting with the reactive group of the crosslinking agent.

Crosslinking Rate(mol %)=[(number of moles of reactive group of crosslinking agent)/(number of moles of reactive group of polymers capable of reacting with reactive group of crosslinking agent)]×100     (5)

In the above calculation formula (5), the "number of moles of reactive group of crosslinking agent" is the value obtained by dividing a weight of the crosslinking agent used by an equivalent amount of the reactive group thereof, that is, the value obtained by multiplying the number of moles of the crosslinking agent used by the number of the reactive groups in a molecule of the crosslinking agent.

[Water Dispersion for Ink-Jet Printing]

The water dispersion for ink-jet printing according to the second invention is produced by the above process, and may be used directly as a water-based ink containing water as a main solvent.

The contents of the respective components in the water dispersion according to the second invention are as follows.

The content of the colorant in the water dispersion is preferably from 1 to 25% by weight, more preferably from 2 to 20% by weight, still more preferably from 4 to 15% by weight and especially preferably from 4 to 8% by weight from the viewpoint of enhancing an optical density thereof. The content of water in the water dispersion according to the second invention is preferably from 20 to 90% by weight, more preferably from 30 to 80% by weight and still more preferably from 40 to 70% by weight.

The surface tension of the water dispersion according to the second invention (as measured at 20° C.) is preferably from 30 to 70 mN/m and more preferably from 35 to 65 mN/m. The viscosity of the water dispersion having a solid content of 20% by weight (as measured at 20° C.) is preferably from 1 to 12 mPa·s, more preferably from 1 to 9 mPa·s, still more preferably from 2 to 6 mPa·s and further still more preferably from 2 to 5 mPa·s.

[Water-Based Ink for Ink-Jet Printing]

The water-based ink for ink-jet printing according to the present invention contains the above water dispersion. The "water-based" as used herein means that water has a maximum content among all dispersing media contained in the water-based ink. As the dispersing media of the water-based ink, there may be used water solely or a mixed solvent of water and at least one organic solvent. The water-based ink may also contain various additives ordinarily used therefor such as a wetting agent, a penetrant, a dispersant, a viscosity modifier, a defoaming agent, a mildew-proof agent and a rust preventive, if required.

The contents of the respective components in the water-based ink according to the present invention are as follows.

The content of the colorant in the water-based ink is preferably from 3 to 30% by weight, more preferably from 4 to 20% by weight, still more preferably from 4 to 15% by weight and especially preferably from 4 to 8% by weight from the viewpoint of enhancing an optical density and a storage stability thereof. The content of water in the water-based ink is preferably from 20 to 90% by weight, more preferably from 30 to 80% by weight and still more preferably from 40 to 70% by weight.

The surface tension of the water-based ink according to the present invention (as measured at 20° C.) is preferably from 23 to 50 mN/m, more preferably from 23 to 45 mN/m and still more preferably from 25 to 40 mN/m. The viscosity of the water-based ink according to the present invention (as measured at 20° C.) is preferably from 2 to 20 mPa·s, more preferably from 2.5 to 16 mPa·s and still more preferably from 2.5 to 12 mPa·s in order to maintain a good ejection reliability thereof.

In addition, the average particle size of the ink particles in the water-based ink is preferably from 30 to 300 nm and more preferably from 50 to 200 nm from the viewpoints of a good suitability for high-speed printers and good printing performance thereof.

The content of water in the water-based ink is from 60% by weight or less, preferably from 20 to 60% by weight, more preferably from 30 to 60% by weight, still more preferably from 30 to 57% by weight and especially preferably from 30 to 55% by weight from the viewpoint of suppressing curling of the resulting print.

The content of the hydrophilic organic solvent in the water-based ink is preferably 10% by weight or more, more preferably from 10 to 35% by weight and still more preferably from 15 to 35% by weight from the viewpoint of suppressing curling of the resulting print and maintaining a good storage stability of the ink while inhibiting increase in viscosity thereof.

The ink-jet printing method to which the water-based ink containing the water dispersion produced by the process according to the second invention is applicable is not particularly limited. However, the water-based ink of the present invention is more suitably applied, in particular, to a piezoelectric-type ink-jet printer.

EXAMPLES

First Invention

In the following production examples and experimental examples, the "part(s)" and "%" indicate "part(s) by weight" and "% by weight", respectively, unless otherwise specified. Meanwhile, the weight-average molecular weight and water-insoluble/water-soluble ratio of polymers, as well as the viscosity, ejection property and optical density of inks were respectively measured and evaluated by the following methods.

(1) Weight-Average Molecular Weight of Polymer

The weight-average molecular weight of the polymer was measured by gel chromatographic method [GPC apparatus: "HLC-8120GPC" available from Tosoh Corporation; column: "TSK-GEL, α-M"×2 available from Tosoh Corporation; flow speed: 1 mL/min)] using a solution prepared by dissolving 60 mmol/L of phosphoric acid and 50 mmol/L of lithium bromide in N,N-dimethyl formamide as a solvent and using a polystyrene as a standard substance.

(2) Water-Insoluble/Water-Soluble Ratio of Polymer (i) In Case of Water-Soluble Polymer (1)

Pure water was added to an aqueous solution of a water-soluble polymer (1) ("JONCRYL 61J"; (a) acrylic acid/(b) styrene=25/75 (weight ratio); available from BASF Japan Ltd.; weight-average molecular weight: 16000; ammonia-100% neutralized product) to prepare a polymer solution having a polymer concentration of 10% by weight. The polymer was completely dissolved in the polymer solution.

(ii) In Case of Water-Insoluble Polymer (2)

A 5N sodium hydroxide aqueous solution was added to a methyl ethyl ketone solution of the water-insoluble polymer (2) obtained in Production Example I-1 to neutralize 100% of the polymer, and 10 g of the neutralized polymer in terms of the pure polymer component was weighed and sampled. The thus obtained neutralized polymer was added dropwise to pure water, and methyl ethyl ketone and a part of water were removed therefrom using a rotary evaporator to obtain a dispersion having a polymer concentration of 10% by weight. The thus obtained dispersion was subjected to centrifugal separation under the same conditions as used in the above (1) to separate the dispersion into a precipitated portion containing the water-insoluble polymer (y-2) and a dissolved portion containing the water-soluble polymer (x-2). The ratio of the water-insoluble polymer (y-2) to the water-soluble polymer (x-2) [water-insoluble polymer (y-2)/water-soluble polymer (x-2)] was 99.7/0.3.

In Table 1, there are shown water-insoluble/water-soluble ratios of the polymers used in the respective Experimental Examples. In Table 1, the amount of the water-soluble polymer (x) represents a total amount of the water-soluble polymers (x-1) and (x-2) [(x-1)+(x-2)], whereas the amount of the water-insoluble polymer (y) represents a total amount of the water-insoluble polymers (y-1) and (y-2) [(y-1)+(y-2)].

(3) Viscosity of Ink

The measurement of the viscosity was carried out at 20° C. using an E-type viscometer "Model No. RE80" available from Told Sangyo Co., Ltd.

(4) Ejection Property of Ink

Using an ink-jet printer "Model No. EM-930C" (piezo-electric type) available from Seiko Epson Corp., an ink cartridge filled with the water-based ink obtained in each Experimental Example was loaded to the printer and repeatedly subjected to cleaning 5 times at room temperature (23° C.) under a relative humidity of 50%, and then nozzle check patterns were printed. The ink was ejected from all of the nozzles to determine whether or not any lack of the nozzle check patterns was present. The less the lack of the nozzle check patterns, the more excellent the ejection property of the ink.

[Evaluation Criteria]

A: No lack of nozzle check patterns was present; and

B: Lack of nozzle check patterns was present.

(5) Optical Density

Solid image printing with the respective water-based inks obtained in Experimental Examples was carried out on a commercially available plain paper ("XEROX 4200" (tradename) available from Xerox Corporation) using an ink-jet printer "Model No. EM-930C" available from Seiko Epson Corp., under the following printing conditions:

Kind of Paper: Plain paper; and

Mode set: Fine.

After allowing the printed paper to stand at 25° C. for 24 h, the optical density values of the resulting print were measured at total 5 points including a central portion and four corners of the paper using a Macbeth densitometer (product name "SPECTROEYE" available from GretagMacbeth GmbH) to calculate an average value thereof. The larger numeral value indicates a higher optical density of the ink.

Production Example I-1

Production of Water-Insoluble Polymer (2)

Twenty one parts of methacrylic acid (component (a)), 20 parts of a styrene macromer ("AS-6S" (tradename) available from Toagosei Co., Ltd.; solid content: 50%; component (c)) (effective ingredient: 10 parts), 39 parts of styrene (component (b)), 15 parts of phenoxy polyethylene glycol polypropylene glycol monomethacrylate ("BLENMER 43PAPE-600B" (tradename) available from NOF Corporation; average molar number of addition of ethylene oxide: 6; average molar number of addition of propylene oxide: 6; component (d)) and 15 parts of polypropylene glycol monomethacrylate ("BLENMER PP-800" (tradename) available from NOF Corporation; average molar number of addition of propylene oxide: 13; component (d)) were mixed with each other to prepare a monomer mixture solution.

Ten parts of methyl ethyl ketone (hereinafter referred to merely as "MEK"), 0.025 part of a chain transfer agent (2-mercaptoethanol) and 10% of the above prepared monomer mixture solution were charged into a reaction vessel and mixed with each other, and then the reaction vessel was fully purged with a nitrogen gas to thereby obtain a mixture solution.

Separately, a mixed solution containing remaining 90% of the above monomer mixture solution, 0.225 part of the above chain transfer agent, 30 parts of MEK and 0.6 part of a radical polymerization initiator (2,2'-azobis(2,4-dimethylvaleronitrile)) was added to a dropping funnel. Then, the monomer mixture solution in the reaction vessel was heated to 65° C. while stirring, and the mixed solution in the dropping funnel was gradually dropped thereinto over 3 h. After the elapse of 2 h at 65° C. from completion of the dropping, a solution prepared by dissolving 0.15 part of the polymerization initiator in 2.5 parts of MEK was added to the resulting reaction solution. The resulting mixture was aged at 65° C. for 2 h and further at 70° C. for 2 h, followed by further adding 57.5 parts of MEK thereto and stirring the obtained mixture for 30 min, to obtain a solution of a water-insoluble polymer (2) ((a)/(b)/(c)/(d)=21/39/10/30 (weight ratio); solid content: 40%; weight-average molecular weight of the water-insoluble polymer (2): 100000; water-insoluble/water-soluble ratio: 99.7/0.3).

Experimental Example I-1

(1) Preparation of Pigment Water Dispersion

Added to 24.8 g of a 31.85% aqueous solution of the water-soluble polymer (1) ("JONCRYL 61J"; available from BASF Japan Ltd.; weight-average molecular weight: 16000; water-insoluble/water-soluble ratio=0/100) were 770.3 g of ion-exchanged water, 8.15 g of a 25% ammonia aqueous solution and 99.4 g of MEK, thereby obtaining an aqueous solution of the water-soluble polymer (1).

Added to the resulting aqueous solution of the water-soluble polymer (1) were 150 g of a pigment "C.I. Pigment Yellow 74" available from Dainichiseika Color & Chemicals Mfg. Co., Ltd., and the resulting mixture was mixed using a disper blade at 20° C. for 1 h, and then 526 g of ion-exchanged water was added thereto, thereby obtaining a preliminary dispersion.

Next, 1580 g of the thus obtained preliminary dispersion were subjected to dispersing treatment by a circulating method using a beads mill type dispersing device ("Ultra Apex Mill UAM-05" (tradename) available from Kotobuki Industries Co., Ltd.) filled with zirconia beads having a particle size of 0.05 mm as media particles under the conditions including a beads filling rate of 85% by volume, an agitation blade peripheral speed of 8 m/s and a circulating flow rate of 200 cc/min for 24 min (total average retention time in the mill: 3.75 min) to obtain a water dispersion in which the pigment was dispersed with the water-soluble polymer (1).

(2) Preparation of Emulsion of Water-Insoluble Polymer (2)

Added to 75.80 g of the solution of the water-insoluble polymer (2) obtained in Production Example I-1 were 5.88 g of MEK, and then 10.3 g of a 5N sodium hydroxide aqueous solution and 107.2 g of ion-exchanged water were added to the resulting mixture. Successively, the thus obtained mixture was mixed using a stirrer to prepare an emulsion of the water-insoluble polymer (2).

(3) Dispersing Treatment of Mixture of Pigment Water Dispersion and Emulsion of Water-Insoluble Polymer (2)

While mixing the water dispersion obtained in the above (1) in which the pigment was dispersed in the water-soluble polymer (1) using a stirrer, the emulsion of the water-insoluble polymer (2) obtained in the above (2) was added thereto, thereby obtaining a mixture.

The thus obtained mixture was subjected to dispersing treatment using a high-pressure homogenizer ("Microfluidizer" (tradename) available from Microfluidics Inc.; pressure: 150 MPa; continuous 5 pass method), thereby obtaining a dispersion.

(4) Removal of Organic Solvent

The dispersion obtained in the above (3) was placed under reduced pressure and heated using a warm water heating medium to remove MEK and a part of water therefrom, and then subjected to centrifugal separation. The obtained dispersion was filtered through a 5 µm-mesh filter (acetyl cellulose membrane; outer diameter: 2.5 cm; available from Fujifilm Corporation) fitted to a 25 mL syringe without a needle (available from Terumo Corporation) to remove coarse particles therefrom, thereby obtaining a water dispersion having a solid content of 30%.

(5) Preparation of Water-Based Ink

The following mixed solution was added to the thus obtained water dispersion to prepare a water-based ink containing a pigment content of 10.0 parts.

Specifically, first, the mixed solution was prepared by mixing 2.0 parts of 1,2-hexanediol (available from Tokyo Kasei Co., Ltd.; solubility parameter: 13.15) as a water-soluble organic solvent, 2.0 parts of 2-pyrrolidone (available from Wako Pure Chemical Industries Ltd.; solubility parameter: 13.66), 2.0 parts of glycerin (available from Kao Corporation; solubility parameter: 19.40), 10.0 parts of triethylene glycol monobutyl ether ("Butyl Triglycol" (tradename) available from Nippon Nyukazai Co., Ltd.; solubility parameter: 10.21), 0.5 part of a nonionic surfactant "SURFYNOL 465" (available from Nissin Chemical Industry Co., Ltd.), 0.5 part of a nonionic surfactant "OLFIN E1010" (available from Nissin Chemical Industry Co., Ltd.), 0.3 part of an antiseptic agent "Ploxel XL2" (available from Avecia K.K., and ion-exchanged water while stirring with a magnetic stirrer, and the resulting mixture was further stirred at room temperature for 15 min, thereby obtaining a mixed solution. In this case, the amount of ion-exchanged water added was adjusted such that a total amount of the mixed solution and the above water dispersion added thereto was 100 parts.

Next, while stirring the previously prepared water dispersion with a magnetic stirrer, the above mixed solution was added thereto, and the resulting mixture was subjected to filtration through a 5 µm-mesh filter (cellulose acetate membrane; available from Sartorius Stedim Japan K.K.), thereby obtaining a water-based ink. The results are shown in Table 1.

Experimental Example I-2

The same procedure as in Experimental Example I-1 was repeated except that the amounts of the solution of the water-insoluble polymer (2), MEK, the 5N sodium hydroxide aqueous solution and ion-exchanged water as used for preparation of the emulsion in Experimental Example I-1(2) were changed to 68.1 g, 7.04 g, 9.46 g and 98.6 g, respectively, thereby obtaining a water-based ink.

Experimental Example I-3

The same procedure as in Experimental Example I-1 was repeated except that the amounts of the solution of the water-insoluble polymer (2), MEK, the 5N sodium hydroxide aqueous solution and ion-exchanged water as used for preparation of the emulsion in Experimental Example I-1(2) were changed to 62.2 g, 6.43 g, 8.64 g and 90.0 g, respectively, thereby obtaining a water-based ink.

Experimental Example I-4

The same procedure as in Experimental Example I-1 was repeated except that the amounts of the 31.85% aqueous solution of the water-soluble polymer (1) ("JONCRYL 61J"), ion-exchanged water, the 25% ammonia aqueous solution and MEK as used for preparation of the pigment water dispersion in Experimental Example I-1(1) were changed to 30.1 g, 773.4 g, 9.88 g and 100.5 g, respectively, and the amounts of the solution of the water-insoluble polymer (2), MEK, the 5N sodium hydroxide aqueous solution and ion-exchanged water as used for preparation of the emulsion in Experimental Example I-1(2) were changed to 82.6 g, 8.54 g, 11.5 g and 119.6 g, respectively, thereby obtaining a water-based ink.

Experimental Example I-5

The same procedure as in Experimental Example I-1 was repeated except that the amounts of the 31.85% aqueous solution of the water-soluble polymer (1) ("JONCRYL 61J"), ion-exchanged water, the 25% ammonia aqueous solution and MEK as used for preparation of the pigment water dispersion in Experimental Example I-1(1) were changed to 30.1 g, 773.4 g, 9.88 g and 100.5 g, respectively, and the amounts of the solution of the water-insoluble polymer (2), MEK, the 5N sodium hydroxide aqueous solution and ion-exchanged water as used for preparation of the emulsion in Experimental Example I-1(2) were changed to 89.8 g, 9.29 g, 12.5 g and 130.0 g, respectively, thereby obtaining a water-based ink.

Experimental Example I-6

The same procedure as in Experimental Example I-1 was repeated except that the amounts of the 31.85% aqueous solution of the water-soluble polymer (1) ("JONCRYL 61J"), ion-exchanged water, the 25% ammonia aqueous solution and MEK as used for preparation of the pigment water dispersion in Experimental Example I-1(1) were changed to 30.1 g, 773.4 g, 9.88 g and 100.5 g, respectively, and the amounts of the solution of the water-insoluble polymer (2), MEK, the 5N sodium hydroxide aqueous solution and ion-exchanged water as used for preparation of the emulsion in Experimental Example I-1(2) were changed to 77.2 g, 5.99 g, 10.5 g and 109.2 g, respectively, thereby obtaining a water-based ink.

Experimental Example I-7

The same procedure as in Experimental Example I-1 was repeated except that the amounts of glycerin and triethylene glycol monobutyl ether as used for preparation of the water-based ink in Experimental Example I-1(5) were changed to 8.5 parts and 0 part, respectively, thereby obtaining a water-based ink.

Experimental Example I-8

The same procedure as in Experimental Example I-1 was repeated except that the amounts of glycerin and triethylene glycol monobutyl ether as used for preparation of the water-based ink in Experimental Example I-1(5) were changed to 0 part and 14.0 parts, respectively, thereby obtaining a water-based ink.

Experimental Example I-9

Added to 40 g of the water dispersion having a solid content of 30% obtained in Experimental Example I-1(4) was 0.445 g of a crosslinking agent ("DENACOL EX-321L" (tradename) available from Nagase ChemteX Corporation; epoxy equivalent: 129; solubility in 100 g of water: about 27 g (at 25° C.)) such that a crosslinking rate of the polymers in the water dispersion was 54 mol %, and the resultant mixture was stirred at 90° C. for 1 h. After completion of the stirring, the obtained reaction mixture was cooled and then filtered through a 5.0 μm-mesh filter (acetyl cellulose membrane; outer diameter: 2.5 cm; available from Fujifilm Corporation), thereby obtaining a water dispersion of pigment-containing crosslinked polymer particles.

Next, the same procedure as in Experimental Example I-1 was repeated except that the water dispersion as used for preparation of the water-based ink in Experimental Example I-1(5) was replaced with the water dispersion of pigment-containing crosslinked polymer particles obtained in this Example, thereby obtaining a water-based ink.

Experimental Example I-10

The same procedure as in Experimental Example I-1 was repeated except that the amounts of the 31.85% aqueous solution of the water-soluble polymer (1) ("JONCRYL 61J"), ion-exchanged water, the 25% ammonia aqueous solution and MEK as used for preparation of the pigment water dispersion in Experimental Example I-1(1) were changed to 30.1 g, 773.4 g, 9.88 g and 100.5 g, respectively, the amounts of the solution of the water-insoluble polymer (2), MEK, the 5N sodium hydroxide aqueous solution and ion-exchanged water as used for preparation of the emulsion in Experimental Example I-1(2) were changed to 77.2 g, 5.99 g, 10.5 g and 109.2 g, respectively, and the amounts of 2-pyrrolidone and triethylene glycol monobutyl ether as used for preparation of the water-based ink in Experimental Example I-1(5) were changed to 5.0 parts and 7.0 parts, respectively, thereby obtaining a water-based ink.

Experimental Example I-21

The same procedure as in Experimental Example I-1 was repeated except that the amounts of the solution of the water-insoluble polymer (2), MEK, the 5N sodium hydroxide aqueous solution and ion-exchanged water as used for preparation of the emulsion in Experimental Example I-1(2) were changed to 172.0 g, 13.3 g, 23.3 g and 243.2 g, respectively, thereby obtaining a water-based ink.

Experimental Example I-22

The same procedure as in Experimental Example I-1 was repeated except that the amounts of the solution of the water-insoluble polymer (2), MEK, the 5N sodium hydroxide aqueous solution and ion-exchanged water as used for preparation of the emulsion in Experimental Example I-1(2) were changed to 20.2 g, 1.57 g, 2.74 g and 28.6 g, respectively, thereby obtaining a water-based ink.

Experimental Example I-23

Added to 93.75 g of the solution of the water-insoluble polymer (2) obtained in Production Example I-1 were 65.0 g of MEK, and then 948.8 g of ion-exchanged water and 8.15 g of the 25% ammonia aqueous solution were added to the resulting mixture. Successively, the resulting mixture was mixed using a stirrer to prepare a polymer emulsion.

Added to the resulting polymer emulsion were 150 g of a pigment "C.I. Pigment Yellow 74", and the resulting mixture was mixed using a disper blade at 20° C. for 1 h, and then 282 g of ion-exchanged water was added thereto, thereby obtaining a preliminary dispersion.

Then, 1595 g of the thus obtained preliminary dispersion were subjected to dispersing treatment using a media dispersing device "Ultra Apex Mill; Model No. UAM-05" (tradename) available from Kotobuki Industries Co., Ltd., under the same conditions as used in Experimental Example I-1(1) to obtain a pigment dispersion.

Next, the same procedure as in Experimental Example I-1 was repeated except that the dispersion as used for removal of the organic solvent in Experimental Example I-1(4) was replaced with the pigment dispersion obtained in this Experimental Example I-23, thereby obtaining a water-based ink.

Experimental Example I-24

Added to 117.5 g of the 31.85% aqueous solution of the water-soluble polymer (1) ("JONCRYL 61J") were 40.5 g of MEK, and then 948.8 g of ion-exchanged water and 8.15 g of the 25% ammonia aqueous solution were added to the resulting mixture, thereby obtaining a polymer aqueous solution.

Added to the resulting polymer aqueous solution were 150 g of a pigment "C.I. Pigment Yellow 74", and the resulting mixture was mixed using a disper blade at 20° C. for 1 h, and then 282 g of ion-exchanged water was added thereto, thereby obtaining a preliminary dispersion.

Then, 1595 g of the thus obtained preliminary dispersion were subjected to dispersing treatment using "Ultra Apex Mill; Model No. UAM-05" under the same conditions as used in Experimental Example I-1(1) to obtain a pigment dispersion.

Next, the same procedure as in Experimental Example I-1 was repeated except that the dispersion as used for removal of the organic solvent in Experimental Example I-1(4) was replaced with the pigment dispersion obtained in this Experimental Example I-24, thereby obtaining a water-based ink.

Experimental Example I-25

The same procedure as in Experimental Example I-1 was repeated except that the amounts of the 31.85% aqueous solution of the water-soluble polymer (1) ("JONCRYL 61J"), ion-exchanged water, the 25% ammonia aqueous solution and MEK as used for preparation of the pigment water dispersion in Experimental Example I-1(1) were changed to 30.1 g, 773.4 g, 9.88 g and 100.5 g, respectively, the amounts of the solution of the water-insoluble polymer (2), MEK, the 5N sodium hydroxide aqueous solution and ion-exchanged water as used for preparation of the emulsion in Experimental Example I-1(2) were changed to 77.2 g, 5.99 g, 10.5 g and 109.2 g, respectively, and the amounts of 1,2-hexanediol, 2-pyrrolidone, glycerin and triethylene glycol monobutyl ether as used for preparation of the water-based ink in Experimental Example I-1 (5) were changed to 0 part, 0 part, 8.5 parts and 0 part, respectively, thereby obtaining a water-based ink.

TABLE I-1

| | | Solubility parameter | \multicolumn{10}{c}{Experimental Examples} |
|---|---|---|---|---|---|---|---|---|---|---|---|---|
| | | | I-1 | I-2 | I-3 | I-4 | I-5 | I-6 | I-7 | I-8 | I-9 | I-10 |
| Contents in ink (wt %) | Pigment (PY74) | | 10 | 10 | 10 | 10 | 10 | 10 | 10 | 10 | 10 | 10 |
| | Water-soluble polymer (x) | | 0.53 | 0.53 | 0.53 | 0.65 | 0.65 | 0.65 | 0.53 | 0.53 | 0.62 | 0.65 |
| | Water-insoluble polymer (y) | | 2.02 | 1.81 | 1.65 | 2.20 | 2.39 | 2.05 | 2.02 | 2.02 | 2.33 | 2.05 |
| | Weight ratio [(y)/(x)] | | 3.8 | 3.4 | 3.1 | 3.4 | 3.7 | 3.2 | 3.8 | 3.8 | 3.8 | 3.2 |
| | Water-soluble organic solvent (B) | TEGmBE*[1] | 10.21 | 10 | 10 | 10 | 10 | 10 | 10 | 0 | 14 | 10 | 7 |
| | | 2-P*[2] | 13.66 | 2 | 2 | 2 | 2 | 2 | 2 | 2 | 2 | 2 | 5 |
| | | 1,2-HD*[3] | 13.15 | 2 | 2 | 2 | 2 | 2 | 2 | 2 | 2 | 2 | 2 |
| | | Glycerin | 19.40 | 2 | 2 | 2 | 2 | 2 | 2 | 8.5 | 0 | 2 | 2 |
| | Water | | | 70.15 | 70.36 | 70.52 | 69.86 | 69.67 | 70 | 73.65 | 68.15 | 69.75 | 70 |
| Content of water-soluble organic solvent (B) (wt %) | | | 16 | 16 | 16 | 16 | 16 | 16 | 12.5 | 18 | 16 | 16 |
| Content of water-soluble organic solvent (B) having a solubility parameter of 5.0 to 15.0 (wt %) | | | 14 | 14 | 14 | 14 | 14 | 14 | 4 | 16 | 14 | 14 |
| Crosslinked or non-crosslinked for water-soluble polymer (x) and water-insoluble polymer (y) | | | ** | ** | ** | ** | ** | ** | ** | ** | *** | ** |
| Pigment/water-soluble polymer (x) | | | 19 | 19 | 19 | 15 | 15 | 15 | 19 | 19 | 16 | 15 |
| Evaluation | Viscosity of ink (mPa·s) | | 3.9 | 4.4 | 5.0 | 5.4 | 4.9 | 5.9 | 4.1 | 4.3 | 3.4 | 5.1 |
| | Ejection property | | A | A | A | A | A | A | A | A | A | A |
| | Optical density | | 1.00 | 1.00 | 1.00 | 1.00 | 1.00 | 0.99 | 0.96 | 1.02 | 1.01 | 0.98 |

| | | Solubility parameter | \multicolumn{5}{c}{Experimental Examples} |
|---|---|---|---|---|---|---|---|
| | | | I-21 | I-22 | I-23 | I-24 | I-25 |
| Contents in ink (wt %) | Pigment (PY74) | | 10 | 10 | 10 | 10 | 10 |
| | Water-soluble polymer (x) | | 0.54 | 0.53 | 0.01 | 2.50 | 0.65 |
| | Water-insoluble polymer (y) | | 4.57 | 0.54 | 2.49 | 0 | 2.05 |
| | Weight ratio [(y)/(x)] | | 8.5 | 1 | 249 | 0 | 3.2 |
| | Water-soluble organic solvent (B) | TEGmBE*[1] | 10.21 | 10 | 10 | 10 | 10 | 0 |
| | | 2-P*[2] | 13.66 | 2 | 2 | 2 | 2 | 0 |
| | | 1,2-HD*[3] | 13.15 | 2 | 2 | 2 | 2 | 0 |
| | | Glycerin | 19.40 | 2 | 2 | 2 | 2 | 8.5 |
| | Water | | | 67.59 | 71.63 | 70.2 | 70.21 | 77.50 |
| Content of water-soluble organic solvent (B) (wt %) | | | 16 | 16 | 16 | 16 | 8.5 |
| Content of water-soluble organic solvent (B) having a solubility parameter of 5.0 to 15.0 (wt %) | | | 14 | 14 | 14 | 14 | 0 |
| Crosslinked or non-crosslinked for water-soluble polymer (x) and water-insoluble polymer (y) | | | ** | ** | ** | ** | ** |
| Pigment/water-soluble polymer (x) | | | 19 | 19 | 1000 | 4 | 15 |

TABLE I-1-continued

| Evaluation | Viscosity of ink (mPa·s) | 2.5 | 11.5 | 7.0 | 18.7 | 3.7 |
|---|---|---|---|---|---|---|
| | Ejection property | A | B | A | B | B |
| | Optical density | 0.93 | 0.62 | 0.75 | 0.48 | 0.93 |

Note
*[1]TEGmBE: Triethylene glycol monobutyl ether;
*[2]2-P: 2-Pyrrolidone;
*[3]1,2-HD: 1,2-Hexanediol;
**: Non-crosslinked;
***: Crosslinked Experimental Example I-11

The same procedure as in Production Example I-1 was repeated except that the amounts of methacrylic acid and styrene as used therein were changed to 17% and 43%, respectively, thereby preparing a water-insoluble polymer. Then, the same procedure as in Experimental Example I-1 was repeated except that the pigment and the water-insoluble polymer as used in Experimental Example I-1 were replaced with "C.I. Pigment Blue 15:3" available from Dainichiseika Color & Chemicals Mfg. Co., Ltd., and the above prepared water-insoluble polymer, thereby obtaining a water-based ink. The results are shown in Table I-2.

Experimental Example I-26

The same procedure as in Production Example I-1 was repeated except that the amounts of methacrylic acid and styrene as used therein were changed to 17% and 43%, respectively, thereby preparing a water-insoluble polymer. Then, the same procedure as in Experimental Example I-23 was repeated except that the pigment and the water-insoluble polymer as used in Experimental Example I-23 were replaced with "C.I. Pigment Blue 15:3" available from Dainichiseika Color & Chemicals Mfg. Co., Ltd., and the above prepared water-insoluble polymer, thereby obtaining a water-based ink. The results are shown in Table I-2.

TABLE I-2

| | | Solubility parameter | Experimental Examples | |
|---|---|---|---|---|
| | | | I-11 | I-26 |
| Contents in ink (wt %) | Pigment (PB15:3) | | 10 | 10 |
| | Water-soluble polymer (x) | | 0.53 | 0.01 |
| | Water-insoluble polymer (y) | | 2.02 | 2.49 |
| | Weight ratio [(y)/(x)] | | 3.8 | 249 |
| | Water-soluble organic solvent (B) | TEGmBE*[1] | 10.21 | 10 | 10 |
| | | 2-P*[2] | 13.66 | 2 | 2 |
| | | 1,2-HD*[3] | 13.15 | 2 | 2 |
| | | Glycerin | 19.40 | 2 | 2 |
| | Water | | 70.15 | 70.2 |
| Content of water-soluble organic solvent (B) (wt %) | | | 16 | 16 |
| Content of water-soluble organic solvent (B) having a solubility parameter of 5.0 to 15.0 (wt %) | | | 14 | 14 |
| Crosslinked or non-crosslinked for water-soluble polymer (x) and water-insoluble polymer (y) | | | ** | ** |
| Pigment/water-soluble polymer (x) | | | 19 | 1000 |
| Evaluation | Viscosity of ink (mPa·s) | | 3.4 | 6.6 |
| | Ejection property | | A | A |
| | Optical density | | 1.01 | 0.91 |

Note
*[1]TEGmBE: Triethylene glycol monobutyl ether;
*[2]2-P: 2-Pyrrolidone;
*[3]1,2-HD: 1,2-Hexanediol;
** Non-crosslinked;
*** Crosslinked From the results shown in Tables I-1 and I-2, it was confirmed that the water-based inks obtained in Experimental Examples I-1 to I-11 according to the first invention were excellent in ejection property and optical density, and exhibited a low viscosity.

<Second Invention>

In the following production examples and experimental examples, the "part(s)" and "%" indicate "part(s) by weight" and "% by weight", respectively, unless otherwise specified. Meanwhile, the weight-average molecular weight of polymers, the average particle size of particles in dispersions, the viscosity of and polymer adsorption rate of water dispersions, and the optical density and storage stability of inks were respectively measured and evaluated by the following methods.

(1) Weight-Average Molecular Weight of Polymer

The weight-average molecular weight of the polymer was measured by gel chromatographic method [GPC apparatus: "HLC-8120GPC" available from Tosoh Corporation; column: "TSK-GEL, α-M"×2 available from Tosoh Corporation; flow speed: 1 mL/min)] using N,N-dimethyl formamide containing 60 mmol/L of phosphoric acid and 50 mmol/L of lithium bromide as a solvent and using a polystyrene as a standard substance.

(2) Average Particle Size of Particles in Water Dispersion

The average particle size of particles in the water dispersion was measured by using a laser particle analyzing system "ELS-8000" (cumulant analysis) available from Otsuka Electronics Co., Ltd. The measurement was conducted at a temperature of 25° C., an angle between incident light and detector of 90° and a cumulative frequency of 100 times, and a refractive index of water (1.333) was input to the analyzing system as a refractive index of the dispersing medium. Further, the measurement was conducted by adjusting a concentration of the dispersion to be measured to about $5 \times 10^{-3}$% by weight and using "Uniform Microparticles" (average particle size: 204 nm) available from Seradyn, Inc., as a standard substance.

(3) Viscosity of Water Dispersion:

The viscosity of the water dispersion having a solid content of 30% by weight was measured at 20° C. using an E-type viscometer "Model No. RE80 Type" available from Toki Sangyo Co., Ltd., and a standard rotor (1°34'×R24).

(4) Polymer Adsorption Rate of Water Dispersion

The water dispersion having a solid content of 30% was diluted with ion-exchanged water until the solid content of the water dispersion reached 20%, and 9 g of the resulting diluted water dispersion was charged into a centrifuge tube "11PA Tube" available from Hitachi-Koki Ltd. Next, the centrifuge tube was set to a centrifugal separator "CR22G" (equipped with a rotor "RPR18-3"; available from Hitachi-Koki Ltd.) and subjected to centrifugal separation at a rotating speed of 18000 r/min for 5 h. After completion of the centrifugal separation, a supernatant of the thus treated liquid was recovered to measure a concentration of solid components contained therein. The adsorption rate of the polymers onto the pigment was calculated from the thus measured solid concentration. Meanwhile, since a trace amount of the pigment was present in the supernatant obtained by the centrifugal separation, the absorbency of the supernatant was measured to determine the amount of the pigment therein according to a previously prepared calibration curve (concerning pigment concentration and absorbency), and correction was made based on the thus measured amount when calculating the amount of the polymers unadsorbed onto the pigment.

Polymer Adsorption Rate=[(Total amount of polymers)−(Amount of solid components in supernatant obtained by centrifugal separation(after being corrected))]/(Total amount of polymers)

(5) Optical Density of Ink

Solid image printing with the respective water-based inks obtained in Experimental Examples was carried out on a commercially available plain paper ("XEROX 4200" (tradename) available from Xerox Corporation; US letter size: 216 mm in width×279 mm in length) using an ink-jet printer ("Model No. EM-930C"; piezoelectric type) available from Seiko Epson Corp., under the following printing conditions:

Kind of paper: plain paper; and
Mode set: fine
Printing speed: 6 sheets/min.

After allowing the printed paper to stand at 25° C. for 24 h, the optical density values of the resulting print (5.1 cm×8.0 cm) were measured at total 5 points including a central portion and four corners thereof using a Macbeth densitometer (product number "SPECTROEYE" available from Gretag-Macbeth GmbH) to calculate an average value thereof. The optical density of the ink was evaluated according to the following evaluation criteria.

[Evaluation Criteria]
○: 1.05 or more; Δ1.04; x:1.03 or less (6) Storage Stability of Ink A screw tube was filled with the ink and hermetically sealed, and the thus filled tube was preserved in a constant temperature oven at 70° C. for one week. The average particle size of particles in the ink and the viscosity of the ink were measured before and after preserved according to the above (2) and (3) to determine a rate of change in the average particle size (%) and a rate of change in the viscosity (%) and thereby evaluate a storage stability of the ink. The closer to 100% the numerals of the respective change rates were, the more excellent the storage stability of the ink became.

Rate of Change in Average Particle Size(%)={[(average particle size(nm)after preserved)−(average particle size(nm)before preserved)]/[initial average particle size(nm)]}×100

Rate of Change in Viscosity(%)={[viscosity after preserved]/[viscosity before preserved])}×100

[Evaluation Criteria]
○: Both of the rate of change in average particle size (%) and the rate of change in viscosity (%) were less than 110%.
x: Both of the rate of change in average particle size (%) and the rate of change in viscosity (%) were 110% or more.

Production Examples II-1 and II-2

Production of Water-Insoluble Polymer

Twenty parts of methyl ethyl ketone and 0.05 part of a chain transfer agent (2-mercaptoethanol) as well as 10% of 200 parts of a monomer mixture having the monomer composition shown in Table II-1 were charged into a reaction vessel and mixed with each other, and then the reaction vessel was fully purged with a nitrogen gas to thereby obtain a mixed solution.

Separately, remaining 90% of the monomer mixture having the monomer composition shown in Table II-1 were charged into a dropping funnel, and further 0.45 part of the chain transfer agent, 60 parts of methyl ethyl ketone and 1.2 parts of a radical polymerization initiator (2,2'-azobis(2,4-dimethylvaleronitrile)) were added thereto and mixed with each other, and the dropping funnel was fully purged with a nitrogen gas to thereby obtain a mixed solution.

The mixed solution in the reaction vessel was heated to 65° C. while stirring in a nitrogen atmosphere, and then the mixed solution in the dropping funnel was gradually dropped thereinto over 3 h. After the elapse of 2 h from completion of the dropping at a temperature of 65° C., a solution prepared by dissolving 0.3 part of the radical polymerization initiator in 5 parts of methyl ethyl ketone was added to the resulting solution, and the thus obtained reaction solution was further aged at 65° C. for 2 h and then at 70° C. for 2 h. Further, 213 parts of methyl ethyl ketone were added to the thus aged reaction solution, and the resulting mixture was stirred for 30 min, thereby obtaining a polymer solution. The results are shown in Table II-1.

TABLE II-1

| | | Production Example II-1 | Production Example II-2 |
|---|---|---|---|
| Kinds of monomers (effective ingredients: wt %) | (a') Methacrylic acid | 21 | 17 |
| | (b') Styrene | 39 | 43 |
| | (c') 43PAPE-600B | 15 | 15 |
| | (c') PP-800 | 15 | 15 |
| | (d') AS-6S | 10 | 10 |
| Polymer obtained | Solid content (wt %) | 40 | 40 |
| | Weight-average molecular weight | 120,000 | 150,000 |

Meanwhile, details of the respective compounds shown in Table II-1 are as follows.

(c') 43PAPE-600B

Phenoxy polyethylene glycol polypropylene glycol monomethacrylate ("BLEMMER 43PAPE-600B" (tradename) available from NOF Corporation; average molar number of addition of ethylene oxide: 6; average molar number of addition of propylene oxide: 6; terminal end group: phenyl group).

(c') PP-800

Polypropylene glycol monomethacrylate ("BLEMMER PP-800" (tradename) available from NOF Corporation; average molar number of addition of propylene oxide: 13; terminal end group: hydroxyl group).

(d') AS-6S

Styrene macromer ("AS-6S" (tradename) available from Toagosei Co., Ltd.; number-average molecular weight: 6000; polymerizable functional group: methacryloyloxy group).

Experimental Example II-1

(1) Preparation of Pigment Dispersion

Added to 37 g of a 30.5% aqueous solution of a water-soluble polymer ("JONCRYL 61J"; available from BASF Japan Ltd.; weight-average molecular weight: 16000) were 1029 g of ion-exchanged water and 222 g of methyl ethyl ketone, thereby obtaining a polymer aqueous solution.

Added to the resulting polymer aqueous solution were 214 g of a yellow pigment "PY74" ("C.I. Pigment Yellow 74" available from Dainichiseika Color & Chemicals Mfg. Co., Ltd.; tradename: "FY615"), and the resulting mixture was mixed using a disper blade at 20° C. for 1 h, thereby obtaining a preliminary dispersion (non-volatile content as calculated based on the above calculation formula (1): 15%) (step (I): preliminary dispersing treatment).

Next, 1500 g of the thus obtained preliminary dispersion were subjected to dispersing treatment by a circulating method using a media dispersing device "Ultra Apex Mill; Model No. UAM-05" (tradename) available from Kotobuki Industries Co., Ltd., which was filled with zirconia beads having a particle size of 0.05 mm as media particles, under the conditions including a beads filling rate of 85% by volume, an agitation blade peripheral speed of 8 m/s and a circulating flow rate of 200 cc/min for 1 h (total average retention time in the mill: 7.5 min) to obtain a pigment dispersion (step (I)(a)).

(2) Preparation of Water-Insoluble Polymer Emulsion

Added to 105 g of the polymer solution obtained in Production Example II-1 were 14.7 g of a 5N sodium hydroxide aqueous solution, 12.6 g of a 25% ammonia aqueous solution and 154 g of ion-exchanged water. Successively, the resulting mixture was mixed using a stirrer to prepare a polymer emulsion (step (I)(b)).

Next, while mixing the pigment dispersion obtained in the above (1) by using a stirrer, the above prepared polymer emulsion was added thereto, thereby obtaining a mixture (non-volatile content as calculated based on the above calculation formula (4): 15%) (step (I)(c)).

(3) Dispersing Treatment of Mixture of Pigment Dispersion and Water-Insoluble Polymer Emulsion The mixture thus obtained in the above (2) was subjected to dispersing treatment under a pressure of 150 MPa by a continuous 5 pass method using a high-pressure homogenizer "MICROFLUIDIZER" (tradename) available from Microfluidics Inc., thereby obtaining a dispersion (step (II)).

(4) Removal of Organic Solvent

The dispersion obtained in the above (3) was placed under reduce pressure and heated using a warm water heating medium to remove methyl ethyl ketone (step (III)) and further remove a part of water therefrom. The obtained dispersion was filtered through a 5 nm-mesh filter (acetyl cellulose membrane; outer diameter: 2.5 cm; available from Fujifilm Corporation) fitted to a 25 mL syringe without a needle (available from Terumo Corporation) to remove coarse particles therefrom, thereby obtaining a water dispersion having a solid content of 30%.

(5) Preparation of Water-Based Ink

The thus obtained water dispersion in an amount of 62.5 parts was mixed with 10 parts of water, 26.2 parts of triethylene glycol monobutyl ether, 1 part of "SURFYNOL 465" available from Nissin Chemical Industry Co., Ltd., and 0.3 part of "Ploxel XL2" available from Avecia K.K. to adjust a water content of the dispersion to 60%.

The thus obtained mixed dispersion was filtered through the above 5 μm-mesh filter fitted to a syringe without a needle in the same manner as described above to remove coarse particles therefrom, thereby obtaining a water-based ink. The results are shown in Table II-2.

Experimental Example II-2

The same procedure as in Experimental Example II-1 was repeated except that the amounts of the polymer aqueous solution, ion-exchanged water and methyl ethyl ketone as used in the step (I)(a) of Experimental Example II-1 were changed to 43.5 g, 1025 g and 222 g, respectively, and the amounts of the polymer solution, the 5N sodium hydroxide aqueous solution, the 25% ammonia aqueous solution and ion-exchanged water as used in the step (I)(b) of Experimental Example II-1 were changed to 99.4 g, 13.8 g, 11.9 g and 145 g, respectively. The results are shown in Table 11-2.

Experimental Example II-3

The same procedure as in Experimental Example II-1 was repeated except that the amounts of the polymer aqueous solution, ion-exchanged water and methyl ethyl ketone as used in the step (I)(a) of Experimental Example II-1 were changed to 56.6 g, 1016 g and 222 g, respectively, and the amounts of the polymer solution, the 5N sodium hydroxide aqueous solution, the 25% ammonia aqueous solution and ion-exchanged water as used in the step (I)(b) of Experimental Example II-1 were changed to 86.3 g, 12.0 g, 10.3 g and 126 g, respectively. The results are shown in Table 11-2.

Experimental Example II-4

The same procedure as in Experimental Example II-1 was repeated except that in the step (I)(b) of Experimental Example II-1, the polymer solution obtained in Production Example II-1 as used therein was replaced with the polymer solution obtained in Production Example II-2, and the amounts of the 5N sodium hydroxide aqueous solution and the 25% ammonia aqueous solution as used therein were changed to 11.9 g and 10.2 g, respectively. The results are shown in Table II-2.

Experimental Example II-5

The same procedure as in Experimental Example II-1 was repeated except that in the step (I)(a) of Experimental Example II-1, the dispersing retention time in the beads mill was changed to 13 min. The results are shown in Table II-2.

Experimental Example II-21

The same procedure as in Experimental Example II-1 was repeated except that the amounts of the polymer aqueous solution, ion-exchanged water, methyl ethyl ketone and the yellow pigment as used in the step (I)(a) of Experimental Example II-1 were changed to 147.5 g, 1028 g, 144.2 and 180 g, respectively, and the steps (I)(b) and (I)(c) were omitted. The results are shown in Table II-2.

Experimental Example II-22

The same procedure as in Experimental Example II-1 was repeated except that in the step (I)(a) of Experimental Example II-1, the polymer aqueous solution was replaced with the polymer solution obtained in Production Example II-1. Added to 112.3 g of the polymer solution were 100.9 g of methyl ethyl ketone, 15.6 g of the 5N sodium hydroxide aqueous solution, 13.5 g of the 25% ammonia aqueous solution, 1099 g of ion-exchanged water and 180 g of the yellow pigment, and further the steps (I)(b) and (I)(c) were omitted. The results are shown in Table II-2.

Experimental Example II-23

The same procedure as in Experimental Example II-1 was repeated except that in the step (I)(b) of Experimental Example II-1, no emulsion was prepared, and the polymer solution obtained in Production Example II-1 was added to the dispersion obtained in the step (I)(a) as a polymer MEK solution. As a result, it was confirmed that the dispersion suffered from aggregation and gelation, thereby failing to obtain the ink as aimed.

Experimental Example II-24

The same procedure as in Experimental Example II-1 was repeated except that the step (I)(b) was not conducted, and all of the raw materials were initially added. The results are shown in Table 11-2.

Experimental Example II-25

The same procedure as in Experimental Example II-1 was repeated except that the step (II) was omitted. The results are shown in Table 11-2.

Experimental Example II-26

The same procedure as in Experimental Example II-1 was repeated except that the organic solvent was removed from the polymer emulsion obtained in the step (I)(b) of Experimental Example II-1, and ion-exchanged water was added only in an amount corresponding to the amount of the organic solvent removed. The results are shown in Table 11-2.

TABLE II-2

| | | | Experimental Examples | | | | |
|---|---|---|---|---|---|---|---|
| | | | II-1 | II-2 | II-3 | II-4 | II-5 |
| Colorant | | Pigment (C.I. No.) | PY74 | PY74 | PY74 | PY74 | PY74 |
| Step (I) Preliminary dispersing treatment | | Kind of polymers (water-soluble (x')/water-insoluble (y')) | JONCRYL*1 | JONCRYL | JONCRYL | JONCRYL | JONCRYL |
| | | Non-volatile content (%) | 15 | 15 | 15 | 15 | 15 |
| Step (I)(a) | | Kind of dispersing device | BM*2 | BM | BM | BM | BM |
| | | Agitation blade peripheral speed (m/s) | 8 | 8 | 8 | 8 | 8 |
| | | Beads filling rate (%) | 85 | 85 | 85 | 85 | 85 |
| | | Total average retention time (min) | 7.5 | 7.5 | 7.5 | 7.5 | 13.0 |
| Step (I)(b) | | Water-insoluble polymer (y') | Production Example 1 | Production Example 1 | Production Example 1 | Production Example 2 | Production Example 1 |
| | | Form of water-insoluble polymer | Emulsion | Emulsion | Emulsion | Emulsion | Emulsion |
| Step (I)(c) | | Weight ratio of polymers*3 | 1/3.75 | 1/3 | 1/2 | 1/3.75 | 1/3.75 |
| Step (II) | | Kind of dispersing device | MF*4 | MF | MF | MF | MF |
| | | Dispersing pressure (MPa) | 150 | 150 | 150 | 150 | 150 |
| | | Number of passes upon dispersing treatment (times) | 5 | 5 | 5 | 5 | 5 |
| | | Use or non-use of organic solvent | Used | Used | Used | Used | Used |
| Properties | Water dispersion | Average particle size (nm) | 121.6 | 136.3 | 123.0 | 122.0 | 127.8 |
| | | Viscosity (mPa·s) | 5.11 | 5.05 | 5.15 | 3.82 | 5.25 |
| | | Polymer adsorption rate (%) | 83 | 80 | 78 | 73 | 80 |
| Evaluation | Ink | Optical density | 1.07 ○ | 1.06 ○ | 1.07 ○ | 1.08 ○ | 1.06 ○ |
| | | Storage stability | ○ | ○ | ○ | ○ | ○ |

| | | | Experimental Examples | | | | | |
|---|---|---|---|---|---|---|---|---|
| | | | II-21 | II-22 | II-23 | II-24 | II-25 | II-26 |
| Colorant | | Pigment (C.I. No.) | PY74 | PY74 | PY74 | PY74 | PY74 | PY74 |
| Step (I) Preliminary dispersing treatment | | Kind of polymers (water-soluble (x')/water-insoluble (y')) | JONCRYL | Production Example 1 | JONCRYL | JONCRYL/ Production Example 1 | JONCRYL | JONCRYL |
| | | Non-volatile content (%) | 15 | 15 | 15 | 15 | 15 | 15 |
| Step (I)(a) | | Kind of dispersing device | BM | BM | BM | BM | BM | BM |

TABLE II-2-continued

| | | | | | | | |
|---|---|---|---|---|---|---|---|
| | Agitation blade peripheral speed (m/s) | 8 | 8 | 8 | 8 | 8 | 8 |
| | Beads filling rate (%) | 85 | 85 | 85 | 85 | 85 | 85 |
| | Total average retention time (min) | 7.5 | 7.5 | 7.5 | 7.5 | 7.5 | 7.5 |
| Step (I)(b) | Water-insoluble polymer (y') | — | — | Production Example 1 | — | Production Example 1 | Production Example 1 |
| | Form of water-insoluble polymer | — | — | MEK solution | — | Emulsion | Emulsion |
| Step (I)(c) | Weight ratio of polymers*3 | 1/0 | 0/1 | 1/3.75 | 1/3.75 | 1/3.75 | 1/3.75 |
| Step (II) | Kind of dispersing device | MF | MF | — | MF | — | MF |
| | Dispersing pressure (MPa) | 150 | 150 | — | 150 | — | 150 |
| | Number of passes upon dispersing treatment (times) | 5 | 5 | — | 5 | — | 5 |
| | Use or non-use of organic solvent | Used | Used | Used | Used | Used | Non-used |
| Properties | Water dispersion Average particle size (nm) | 80.4 | 136.4 | — | 117 | 214.4 | 106.4 |
| | Viscosity (mPa·s) | 4.34 | 7.37 | — | 5.3 | 8.26 | 3.88 |
| | Polymer adsorption rate (%) | 85 | 69 | — | 83 | 23 | 21 |
| Evaluation | Ink Optical density | 1.02 X | 1.03 X | Gelation, not evaluable | 1.05 ○ | Gelation, not evaluable | 1.04 Δ |
| | Storage stability | X | ○ | — | X | — | X |

Note
*1JONCRYL: "JONCRYL 61J" available from BASF Japan, Ltd.; weight-average molecular weight: 2000
*2BM: Beads mill ("Ultra Apex Mill" (tradename) available from Kotobuki Industries Co., Ltd.)
*3Weight ratio: (water-soluble polymer (x'))/(water-insoluble polymer (y'))
*4MF: Chamber-type high-pressure homogenizer ("Microfluidizer" (tradename) available from Microfluidics Inc.)

From Table II-2, it was confirmed that the water-based inks obtained in Experimental Examples II-1 to II-5 were excellent in optical density and storage stability. On the contrary, it was confirmed that the water-based inks obtained in Experimental Examples II-21, II-22 and II-26 had a low optical density, the water-based inks obtained in Experimental Examples II-23 and II-25 suffered from aggregation and gelation, and the water-based inks obtained in Experimental Examples II-21, II-24 and II-26 were deteriorated in storage stability, thereby failing to obtain the inks as aimed.

INDUSTRIAL APPLICABILITY

The water-based ink for ink-jet printing according to the first invention is excellent in ejection property and optical density, and exhibits a low viscosity. In addition, in accordance with the production process of the second invention, it is possible to produce a water dispersion for ink-jet printing which can exhibit a high optical density suitable for high-speed printing in an efficient manner.

The invention claimed is:
1. A water-based ink for ink-jet printing comprising colorant-containing polymer particles (A) obtained by dispersing a colorant with a water-soluble polymer (x) and a water-insoluble polymer (y), a water-soluble organic solvent (B) and water, wherein a weight ratio of the water-insoluble polymer (y) to the water-soluble polymer (x) [(y)/(x)] is from 2.0 to 5.0, a content of the water-soluble organic solvent (B) in the ink is from 10 to 70% by weight, and wherein the water-soluble polymer (x) and the water-insoluble polymer (y) are subjected to crosslinking treatment.

2. The water-based ink for ink-jet printing according to claim 1, wherein a weight ratio of the colorant to the water-soluble polymer (x) [colorant/water-soluble polymer (x)] is from 12 to 25.

3. The water-based ink for ink-jet printing according to claim 1, wherein the water-soluble organic solvent (B) has a solubility parameter of from 5.0 to 15.0, and a content of the water-soluble organic solvent (B) in the ink is from 10 to 50% by weight.

4. The water-based ink for ink-jet printing according to claim 1, wherein the water-soluble polymer (x) is an anionic group-containing water-soluble polymer (x) and the water-insoluble polymer (y) is an anionic group-containing water-insoluble polymer (y), and the anionic group-containing water-soluble polymer (x) and the anionic group-containing water-insoluble polymer (y) are subjected to crosslinking treatment using a crosslinking agent containing two or more functional groups capable of reacting with the anionic groups of the polymers in a molecule thereof.

5. The water-based ink for ink-jet printing according to claim 1, wherein the colorant-containing polymer particles (A) are particles obtained by mixing a water dispersion prepared by dispersing the colorant in the water-soluble polymer (x) with an emulsion of the water-insoluble polymer (y) containing an organic solvent, and then dispersing the resulting mixture.

6. A process for producing a water dispersion for ink-jet printing, comprising the following steps (I) to (III):
Step (I): mixing a dispersion of a colorant with an emulsion of a water-insoluble polymer containing an organic solvent;

Step (II): subjecting a mixture obtained in the step (I) to dispersing treatment to obtain a dispersion of the colorant onto which the water-insoluble polymer (y') is deposited; and Step (III): removing the organic solvent from the dispersion obtained in the step (II);

wherein the emulsion of the water-insoluble polymer is in the form of an emulsion composition comprising the water-insoluble polymer (y') containing a salt-forming group, the organic solvent having a solubility in water at 20° C. of from 5 to 40% by weight, a neutralizing agent and water.

7. The process for producing a water dispersion for ink-jet printing according to claim 6, wherein the dispersion of the colorant is a dispersion comprising at least the colorant, a water-soluble polymer (x') and water.

8. The process for producing a water dispersion for ink-jet printing according to claim 6, wherein the dispersion of the colorant is in the form of a pigment dispersion prepared by dispersing a pigment using a media dispersing device.

9. The process for producing a water dispersion for ink-jet printing according to claim 6, wherein a weight ratio of the water-soluble polymer (x') to the water-insoluble polymer (y') [water-soluble polymer (x')/water-insoluble polymer (y')] is from 2/1 to 1/5.

10. An water-based ink for ink-jet printing comprising the water dispersion for ink-jet printing which is produced by the process as defined in claim 6.

* * * * *